(12) United States Patent
Chen et al.

(10) Patent No.: US 8,618,241 B2
(45) Date of Patent: *Dec. 31, 2013

(54) STABILIZED ELECTRO-OPTIC MATERIALS AND ELECTRO-OPTIC DEVICES MADE THEREFROM

(75) Inventors: Baoquan Chen, Bothell, WA (US); Danliang Jin, Bothell, WA (US); Guomin Yu, Bothell, WA (US); Hui Chen, Kirkland, WA (US); Diyun Huang, Watertown, MA (US)

(73) Assignee: GigOptix, Inc., San Jose, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 12/959,898

(22) Filed: Dec. 3, 2010

(65) Prior Publication Data

US 2012/0157584 A1 Jun. 21, 2012

Related U.S. Application Data

(63) Continuation-in-part of application No. 12/270,714, filed on Nov. 13, 2008, now Pat. No. 7,902,322.

(60) Provisional application No. 61/003,443, filed on Nov. 15, 2007, provisional application No. 61/315,797, filed on Mar. 19, 2010, provisional application No. 61/383,282, filed on Sep. 15, 2010.

(51) Int. Cl.
*C08G 75/00* (2006.01)

(52) U.S. Cl.
USPC .............. 528/380; 528/422; 549/50; 549/474

(58) Field of Classification Search
USPC .............................. 528/380, 422; 549/50, 474
See application file for complete search history.

(56) References Cited

U.S. PATENT DOCUMENTS

| | | | |
|---|---|---|---|
| 6,716,995 B2 | 4/2004 | Huang et al. | |
| 7,078,542 B2 | 7/2006 | Jen et al. | |
| 7,902,322 B2 * | 3/2011 | Huang et al. | 528/380 |
| 2002/0160282 A1 * | 10/2002 | Huang et al. | 430/7 |
| 2008/0004415 A1 * | 1/2008 | McGinniss et al. | 528/26 |
| 2008/0009620 A1 | 1/2008 | Goetz et al. | |

FOREIGN PATENT DOCUMENTS

| | | |
|---|---|---|
| JP | 06-182934 | 7/1994 |
| JP | 2000-256320 | 9/2000 |
| JP | 2000-319234 | 11/2000 |
| JP | 2004-506630 | 3/2004 |
| WO | WO98-21198 | 5/1998 |

OTHER PUBLICATIONS

R. Gujadhur et al., "Formation of aryl-nitrogen bonds using a soluble copper (I) catalyst", Department of Chemistry, Tetrahedron Letters 42 (2001) pp. 4791-4793.

(Continued)

*Primary Examiner* — Shane Fang
(74) *Attorney, Agent, or Firm* — Christopher A. Wiklof; Launchpad IP, Inc.

(57) ABSTRACT

According to an embodiment, an electro-optic polymer comprises a host polymer and a guest nonlinear optical chromophore having the structure D-π-A, wherein: D is a donor, π is a π-bridge, and A is an acceptor; a bulky substituent group is covalently attached to at least one of D, π, or A; and the bulky substituent group has at least one non-covalent interaction with part of the host polymer that impedes chromophore depoling.

36 Claims, 15 Drawing Sheets

(56) References Cited

OTHER PUBLICATIONS

M. Beller et al., "Synthesis of 2,3-Dihydroindoles, Indoles, and Anilines by Transition Metal-Free Amination of Aryl Chlorides", American Chemical Society (2001), vol. 66, No. 4, pp. 1403-1412.

G. Grasa et al., "Amination Reactions of Aryl Halides with Nitrogen-Containing Reagents Mediated by Palladium/Imidazolium Salty Systems", American Chemical Society (2001), vol. 66 No. 23, pp. 7729-7737.

Transmittal of PCT International Search Report for PCT International Application No. PCT/US2008/083418; Sep. 25, 2009.

PCT International Search Report for PCT International Application No. PCT/US2008/083418; Sep. 25, 2009.

PCT Written Opinion of the International Searching Authority for PCT International Application No. PCT/US2008/083418; Sep. 25, 2009.

Geoffrey A. Lindsay et al. "Multi-month Thermal Aging of Electro-Optic Polymer Waveguides: Synthesis, Fabrication, and Relaxation Modeling." Elsevier, Polymer 48 (2007): 6605-6616.

* cited by examiner

24

25　　　　　26　　　　　27

28

29

30

FIG 7
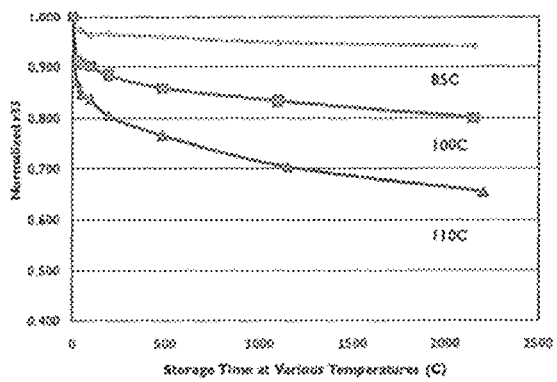
Fig 7A
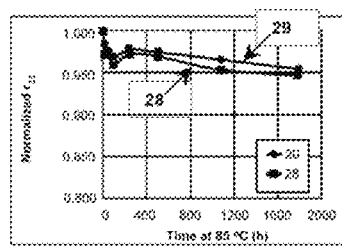
Fig 7B
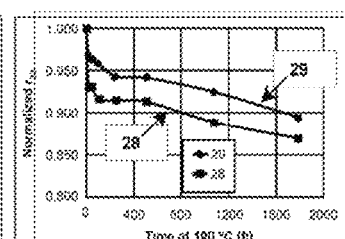
Fig 7C
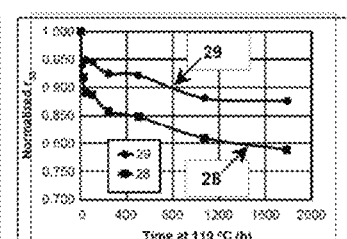
Fig 7D
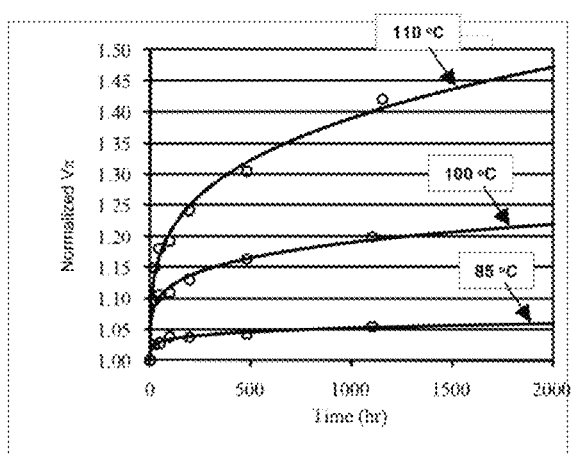
Fig 7E
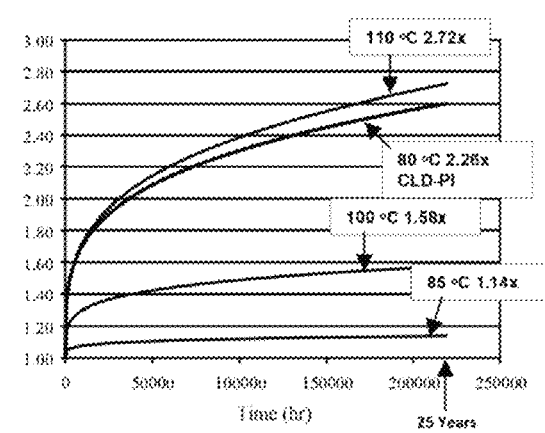
Fig 7F FIG 8
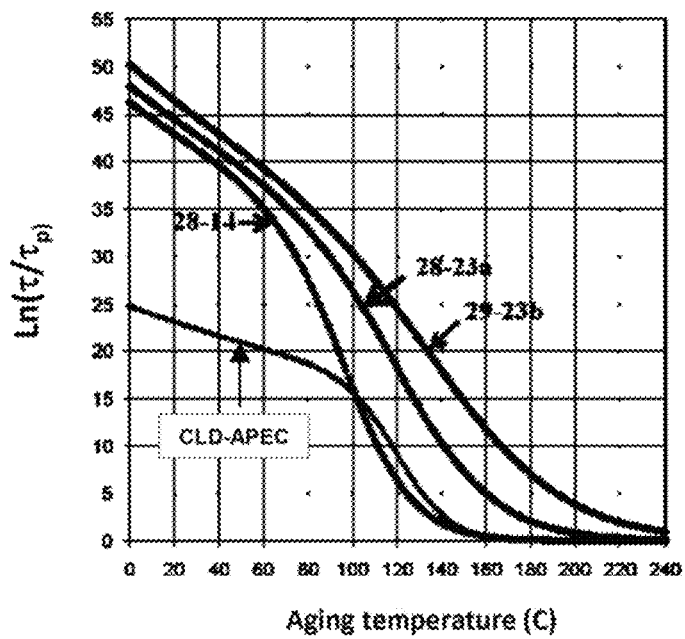
FIG 8A
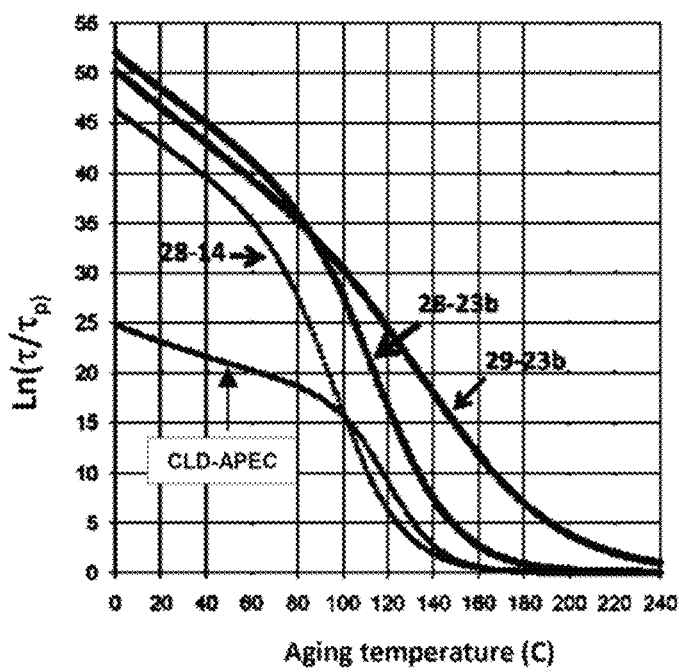
FIG 8B FIG 13
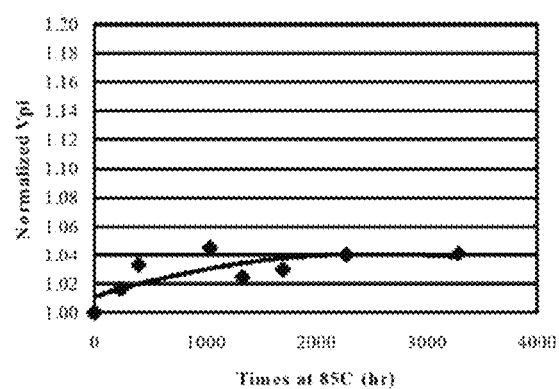
FIG 13a
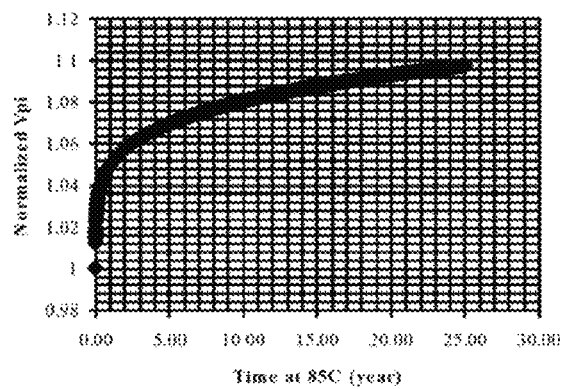
FIG 13b Top View Side View

FIG 15
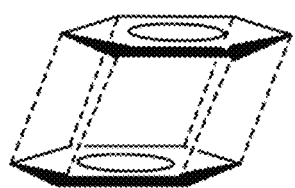
FIG 15A
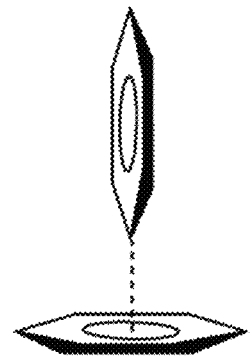
FIG 15B
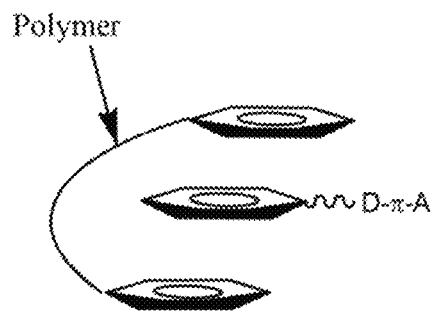 or 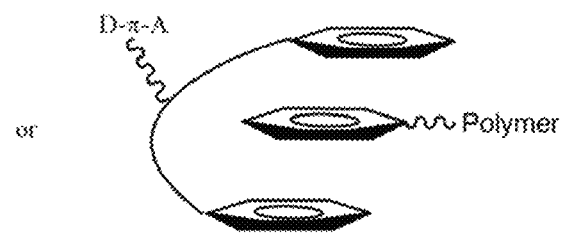
FIG 15C
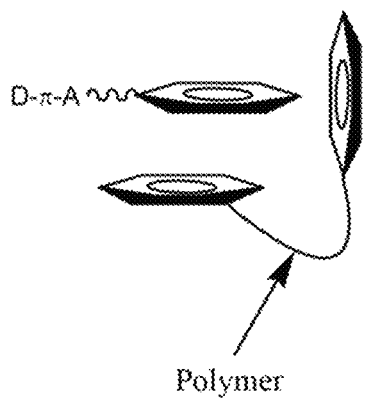 or 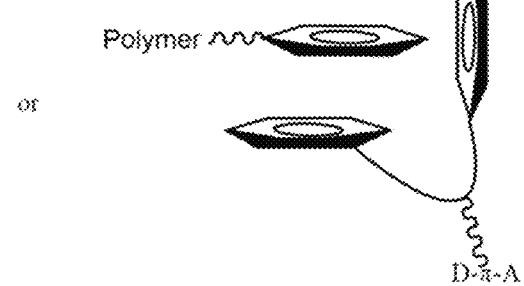
FIG 15D

STABILIZED ELECTRO-OPTIC MATERIALS AND ELECTRO-OPTIC DEVICES MADE THEREFROM

CROSS-REFERENCE TO RELATED APPLICATIONS

The present application is a Continuation-in-Part of, and claims priority from U.S. patent application Ser. No. 12/270,714, entitled NONLINEAR OPTICAL CHROMOPHORES WITH STABILIZING SUBSTITUENT AND ELECTRO-OPTIC DEVICES, filed Nov. 13, 2008 now U.S. Pat. No. 7,902,322; which claims priority benefit from U.S. Provisional Patent Application Ser. No. 61/003,443, entitled NONLINEAR OPTICAL CHROMOPHORES WITH STABILIZING SUBSTITUENT AND ELECTRO-OPTIC DEVICES, filed Nov. 15, 2007; both of which are, to the extent not inconsistent with the disclosure herein, incorporated by reference in their entirety. The present application also claims priority benefit from U.S. Provisional Patent Application Ser. No. 61/315,797, entitled ELECTRO-OPTIC CHROMOPHORE MATERIAL AND DEVICES WITH ENHANCED STABILITY, filed Mar. 19, 2010; and claims priority benefit from U.S. Provisional Patent Application Ser. No. 61/383,282, entitled ELECTRO OPTIC CHROMOPHORE AND HOST POLYMER SYSTEM FOR INTEGRATED CIRCUIT COMMUNICATION, filed Sep. 15, 2010; both of which are, to the extent not inconsistent with the disclosure herein, incorporated by reference in their entirety.

STATEMENT REGARDING FEDERALLY SPONSORED RESEARCH OR DEVELOPMENT

The inventions disclosed herein were made the U.S. Government support pursuant to NRO Contract No. NRO000-07-C-0123 and DARPA Contract No. W31P4Q-08-C-0198. Accordingly, the Government may have certain rights in the inventions disclosed herein.

BACKGROUND

Nonlinear optical chromophores provide the electro-optic (EO) activity in poled, electro-optic polymer devices. Electro-optic polymers have been investigated for many years as an alternative to inorganic materials such as lithium niobate in electro-optic devices. Electro-optic devices may include, for example, external modulators for telecom, RF photonics, and optical interconnects and so forth. High electro-optic activity and the stability of electro-optic activity, which is also referred to as "temporal stability", are important for commercially viable devices. Electro-optic activity may be increased in electro-optic polymers by increasing the concentration of nonlinear optical chromophores and by increasing of the electro-optic property of chromophores. However, some techniques for increasing chromophore concentration may decrease temporal stability.

OVERVIEW

One embodiment is an electro-optic polymer comprising a host polymer and a guest nonlinear optical chromophore having the structure D-π-A, wherein: D is a donor, π is a π-bridge, and A is an acceptor; a bulky substituent group is covalently attached to at least one of D, π, or A; and the bulky substituent group has at least one non-covalent interaction with part of the host polymer that impedes chromophore depoling.

One embodiment is an electro-optic polymer comprising a poled nonlinear optical chromophore and a host polymer, wherein the nonlinear optical chromophore is substituted with two or more bulky groups and the host polymer is configured to cooperate with the bulky groups to impede chromophore depoling.

One embodiment is a nonlinear optical chromophore having the structure D-π-A, wherein D is a donor, π is a π-bridge, and A is an acceptor, and wherein at least one of D, π, or A is covalently attached to a substituent group including a substituent center that is directly bonded to at least three aryl groups.

Another embodiment is an electro-optic polymer including a nonlinear optical chromophore having the structure D-π-A, wherein D is a donor, π is a π-bridge, A is an acceptor, and at least one of D, π, or A is covalently attached to a substituent group including a substituent center that is directly bonded to an aryl group, and wherein the electro-optic polymer has greater temporal stability than when an alkyl group is substituted for the aryl group. According to embodiments, a plurality of aryl groups may be directly bonded to the substituent center.

Another embodiment is a method, including a) providing a polymer including a nonlinear optical chromophore having the structure D-π-A, wherein D is a donor, π is a π-bridge, A is an acceptor, and at least one of D, π, or A is covalently attached to a substituent group including a substituent center that is directly bonded to at least one aryl group; and b) poling the polymer to form and electro-optic polymer, wherein the electro-optic polymer has greater temporal stability than when an alkyl group is substituted for the aryl group.

Other embodiments include electro-optic devices including the nonlinear optical chromophores and electro-optic polymers.

BRIEF DESCRIPTION OF THE DRAWINGS

FIG. 7 illustrates Jonscher analyses of temporal stability according to certain embodiments.

FIG. 8 illustrates hyperbolic tangent model analyses of temporal stability according to certain embodiments.

FIG. 13 illustrates long temporal stability of a polymer modulator.

FIG. 15 illustrates pi-interactions according to some embodiments.

DETAILED DESCRIPTION

Figure 1:
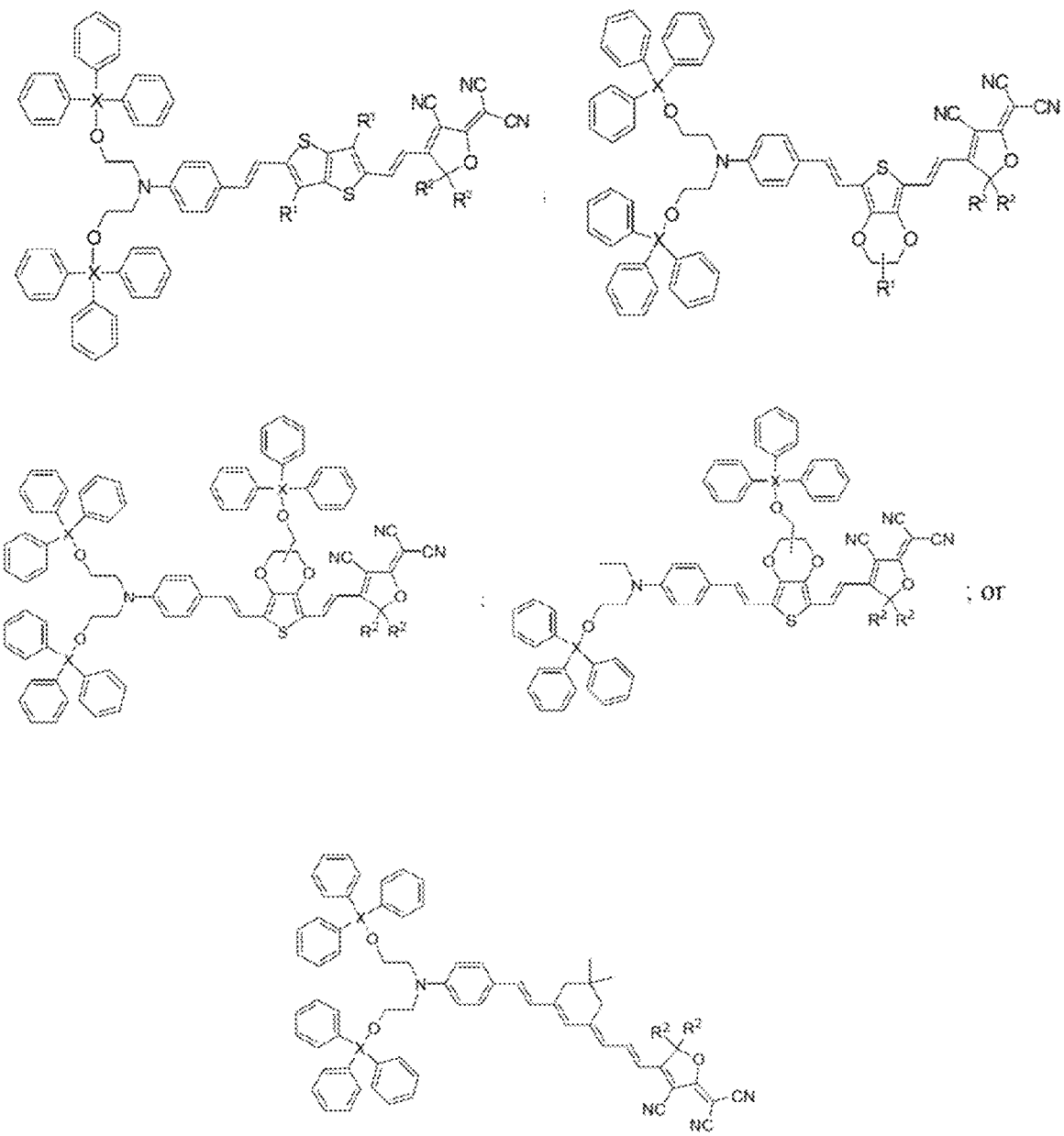
FIG. 1 illustrates nonlinear optical chromophores according to embodiments.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here.

According to an embodiment, an organic chromophore includes aryl substituents. The aryl substituents may provide additional steric bulk to the chromophores and allow higher concentrations of the chromophores. The aryl substituents may also provide thermal, temporal, and/or other stability enhancements.

One embodiment is a second order nonlinear optical chromophore having the structure D-π-A, wherein D is a donor, π is a π-bridge, and A is an acceptor, and wherein at least one of D, π, or A is covalently attached to a substituent group including a substituent center that is directly bonded to at least two aryl groups, preferably three aryl groups. What is meant by terms such as donor, π-bridge, and acceptor; and general synthetic methods for forming D-π-A chromophores are known in the art, see for example U.S. Pat. No. 6,716,995, incorporated by reference herein.

A donor (represented in chemical structures by "D" or "D$^n$" where n is an integer) includes an atom or group of atoms that has a low oxidation potential, wherein the atom or group of atoms can donate electrons to an acceptor "A" through a π-bridge. The donor (D) has a lower electron affinity that does the acceptor (A), so that, at least in the absence of an external electric field, the chromophore is generally polarized, with relatively less electron density on the donor (D). Typically, a donor group contains at least one heteroatom that has a lone pair of electrons capable of being in conjugation with the p-orbitals of an atom directly attached to the heteroatom such that a resonance structure can be drawn that moves the lone pair of electrons into a bond with the p-orbital of the atom directly attached to the heteroatom to formally increase the multiplicity of the bond between the heteroatom and the atom directly attached to the heteroatom (i.e., a single bond is formally converted to double bond, or a double bond is formally converted to a triple bond) so that the heteroatom gains formal positive charge. The p-orbitals of the atom directly attached to the heteroatom may be vacant or part of a multiple bond to another atom other than the heteroatom. The heteroatom may be a substituent of an atom that has pi bonds or may be in a heterocyclic ring. Exemplary donor groups include but are not limited to $R_2N$— and, $R_nX^1$—, where R is alkyl, aryl or heteroaryl, $X^1$ is O, S, P, Se, or Te, and n is 1 or 2. The total number of heteroatoms and carbons in a donor group may be about 30, and the donor group may be substituted further with alkyl, aryl, or heteroaryl. The "donor" and "acceptor" terminology is well known and understood in the art. See, e.g., U.S. Pat. Nos. 5,670,091, 5,679,763, and 6,090,332.

An acceptor (represented in chemical structures by "A" or "A$^n$" where n is an integer) is an atom or group of atoms that has a low reduction potential, wherein the atom or group of atoms can accept electrons from a donor through a π-bridge. The acceptor (A) has a higher electron affinity that does the donor (D), so that, at least in the absence of an external electric field, the chromophore is generally polarized, with relatively more electron density on the acceptor (D). Typically, an acceptor group contains at least one electronegative heteroatom that is part of a pi bond (a double or triple bond) such that a resonance structure can be drawn that moves the electron pair of the pi bond to the heteroatom and concomitantly decreases the multiplicity of the pi bond (i.e., a double bond is formally converted to single bond or a triple bond is formally converted to a double bond) so that the heteroatom gains formal negative charge. The heteroatom may be part of a heterocyclic ring. Exemplary acceptor groups include but are not limited to —$NO_2$, —CN, —CHO, COR, $CO_2R$, —PO$(OR)_3$, —SOR, —$SO_2R$, and —$SO_3R$ where R is alkyl, aryl, or heteroaryl. The total number of heteroatoms and carbons in an acceptor group is about 30, and the acceptor group may be substituted further with alkyl, aryl, and/or heteroaryl. The "donor" and "acceptor" terminology is well known and understood in the art. See, e.g., U.S. Pat. Nos. 5,670,091, 5,679,763, and 6,090,332.

A "π-bridge" or "electronically conjugated bridge" (represented in chemical structures by "π" or "π$^n$" where n is an integer) includes an atom or group of atoms through which electrons may be delocalized from an electron donor (defined above) to an electron acceptor (defined above) through the orbitals of atoms in the bridge. Such groups are very well known in the art. Typically, the orbitals will be p-orbitals on double (sp$^2$) or triple (sp) bonded carbon atoms such as those found in alkenes, alkynes, neutral or charged aromatic rings, and neutral or charged heteroaromatic ring systems. Additionally, the orbitals may be p-orbitals on atoms such as boron or nitrogen. Additionally, the orbitals may be p, d or f orgonometallic orbitals or hybrid organometallic orbitals. The atoms of the bridge that contain the orbitals through which the electrons are delocalized are referred to here as the "critical atoms." The number of critical atoms in a bridge may be a number from 1 to about 30. The critical atoms may be substituted with an organic or inorganic group. The substituent may be selected with a view to improving the solubility of the chromophore in a polymer matrix, to enhancing the stability of the chromophore, or for other purpose.

The substituent group (or any of multiple substituent groups) may be covalently attached to one or more of D, π, and A through a variety of linkages including single bonds, single atoms, heteroatoms, metal atoms (e.g., organometallics), aliphatic chains, aryl rings, functional groups, or combinations thereof. The substituent center may have multiple atoms (e.g., an aryl or aliphatic ring), may be a single atom (e.g., a carbon, silicon, or metal atom), or may be a combination thereof (e.g., a ring system where one aryl group is bonded to one atom of the ring system and the other two aryl groups are bonded to another atom in the ring system).

For example, in some embodiments the substituent center includes a carbon atom, a heteroatom, or a metal atom. In other embodiments, the substituent center may be a carbon atom, a silicon atom, a tin atom, a sulfur atom, a nitrogen atom, or a phosphorous atom. In an embodiment, the substituent center may be a 3-, 4-, 5-, or 6-membered ring like a benzene ring, thiophene ring, furan ring, pyridine ring, imidazole ring, pyrrole ring, thiazole ring, oxazole ring, pyrazole ring, isothiazole ring, isooxazole ring, or triazole ring.

The aryl groups bonded to the substituent center may be further substituted with alkyl groups, heteroatoms, aryl groups, or a combination thereof. For example, in some embodiments, the aryl groups may, independently at each position, comprise a phenyl ring, a naphthyl ring, a biphenyl group, a pyridyl ring, a bipyridyl group, thiophene group, furan group, imidazole group, pyrrole group, thiazole group, oxazole group, pyrazole group, isothiazole group, isooxazole group, triazole group or an anthracenyl group.

In an embodiment, the substituent group includes the structure:

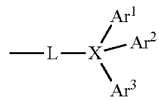

wherein: X is the substituent center; Ar¹, Ar², and Ar³ are the aryl groups; and L is a covalent linker attached to D, π, or A. According to various embodiments, X may be C, Si, N, B, Sn, S, S(O), SO₂, P(O) (phosphine oxide), P (phosphine), or an aromatic ring of any kind. In some embodiments, Ar¹, Ar², and Ar³ each independently include a substituted or un-substituted phenyl ring, a substituted or un-substituted benzyl ring, a substituted or un-substituted naphthyl ring, a substituted or un-substituted biphenyl group, a substituted or un-substituted pyridyl ring, a substituted or un-substituted bipyridyl group, a substituted or un-substituted thiophene ring, a substituted or un-substituted benzothiophenene ring, a substituted or un-substituted imidazole ring, a substituted or un-substituted thiozale ring, substituted or un-substituted thienothiophene group, substituted or un-substituted a substituted or un-substituted quinoline group, or a substituted or un-substituted anthracenyl group. In some embodiments, L includes the structure:

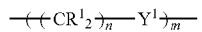

wherein: $R^1$ is independently at each occurrence an H, an alkyl group, or a halogen; $Y^1$ is —C(R¹)₂—, O, S, —N(R¹)—, —N(R¹)C(O)—, —C(O)₂—, —C₆H₆—, or —OC₆H₆—, thiophenyl, n is 0-6; and m is 1-3.

Electro-optic polymers including these nonlinear optical chromophores may show high electro-optic coefficient. The temporal stability is significantly increased compared to electro-optic polymers including chromophores where alkyl groups are substituted for the aryl groups, where the aryl groups have π(pi)-π(pi) interactions (also referred to herein as pi interactions) between aryl bulky groups on the chromophore and aryl groups on polymer. In this context, the symbol "π" may be used generally to refer to a system of one or more multiple bonds, linear or cyclic, as is known on the art instead of in the context of representing the conjugated π-bridge of a chromophore. The aryl groups may be sterically larger than the alkyl groups. The pi-interactions between the aryl bulky group/s on the chromophore and the aryl groups on the polymer may be enhanced by complementary geometric dispositions of the aryl groups that enhance the pi interactions (e.g., aryl groups tetrahedrally disposed around a substituent center in the chromophore bulky group may favorably pi-interact (e.g., stack) more efficiently with aryl groups tetrahedrally disposed around a carbon in the polymer backbone).

Donors, acceptors, and π-bridge moieties may include functional groups that may be covalently bonded to the L group.

According to embodiments, D includes:

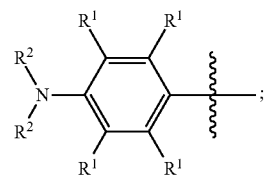

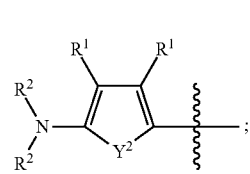

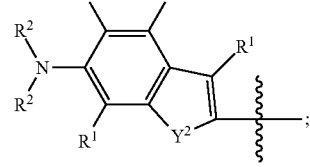

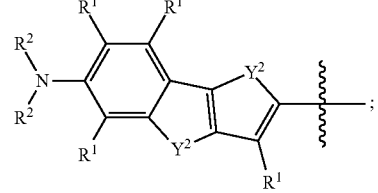

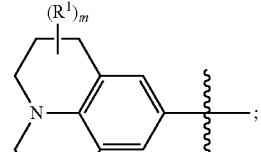

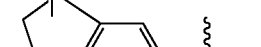
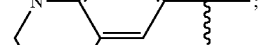

-continued
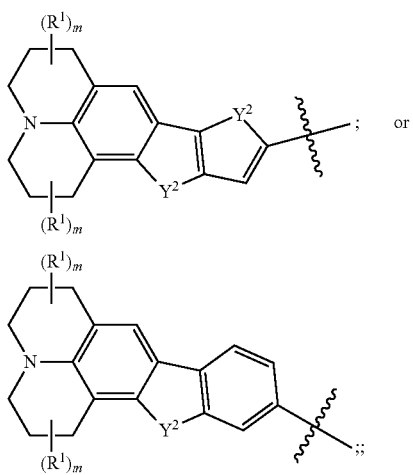
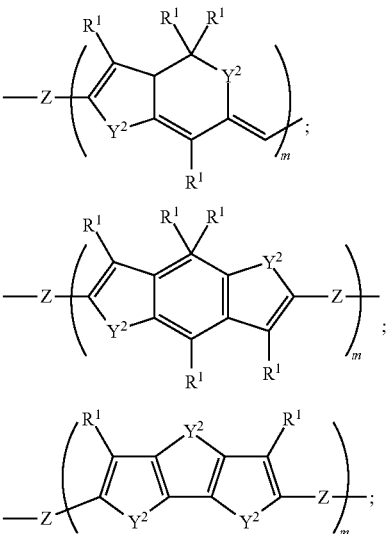
π includes:
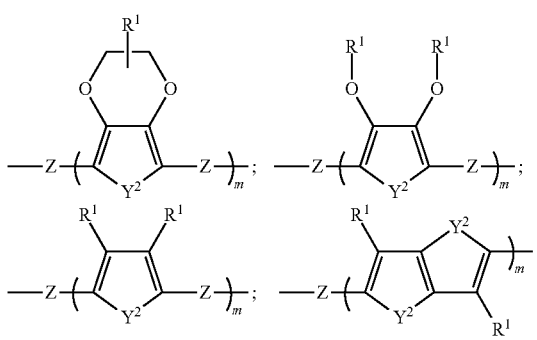
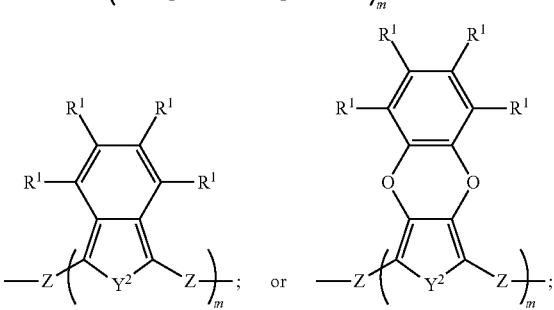
and A includes:
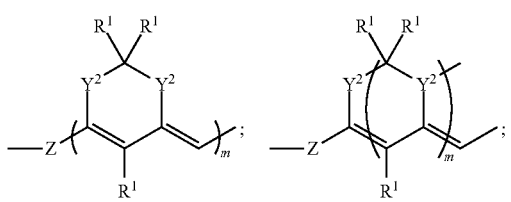 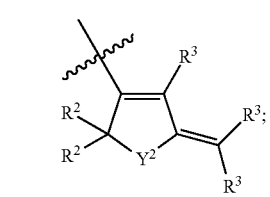
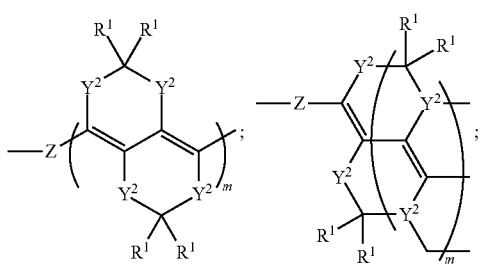 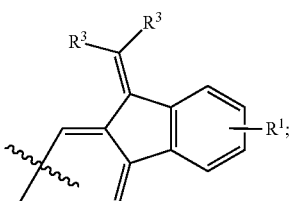
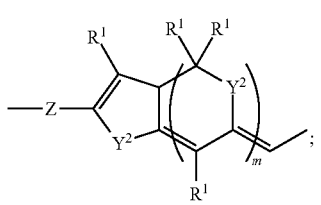 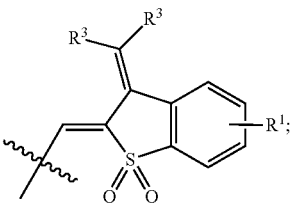 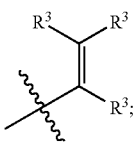

-continued

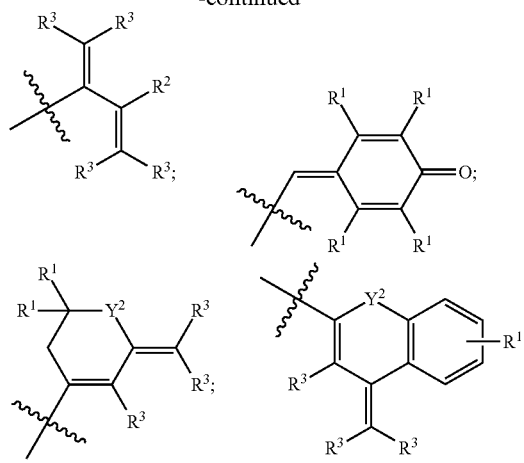

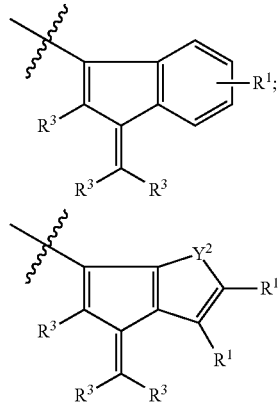

wherein: R¹, independently at each occurrence is H, an aliphatic group such as an alkyl or alkoxy group, or an aryl group. R², independently at each occurrence, is an alkyl group, a halogenated alkyl group, a halogenated aryl group, or an aryl group with or without substitutions; Z is a single bond, —CH═CH—, —C≡C—, —N═N—, or —N═CH—; $Y^2$, independently at each occurrence, is $CH_2$, O, S, $N(R^1)$, $Si(R^1)$, $S(O)$, $SO_2$, —$CH(R^1)$— or —$C(R^1)_2$—; $R^3$ independently at each occurrence is a cyano group, a nitro group, an ester group, or a halogen; and at least one $R^1$, $R^2$, or $R^3$ includes the substituent group. m is 1-6 and n is 1-4, In another embodiment, D has one of the structures:

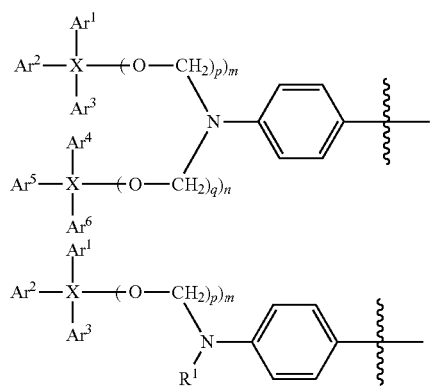

-continued

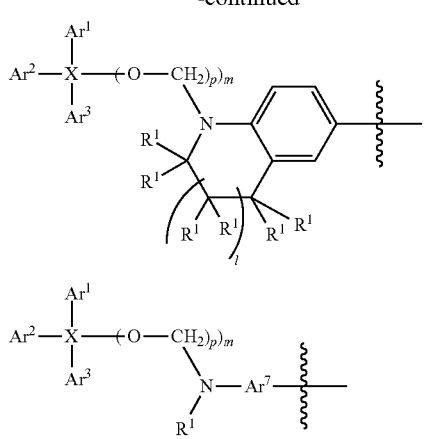

wherein X is a substituent center; $Ar^1$, $Ar^2$, $Ar^3$, $Ar^4$, $Ar^5$, and $Ar^6$ are aryl groups; $Ar^7$ is a conjugated aromatic group; $R^1$ of D independently at each occurrence is H, an alkyl group, a heteroalkyl group, an aryl group, or a hetero aryl group; p is 2-6; l is 0-2; m is 1-3; and n is 1-3; π has the structure:

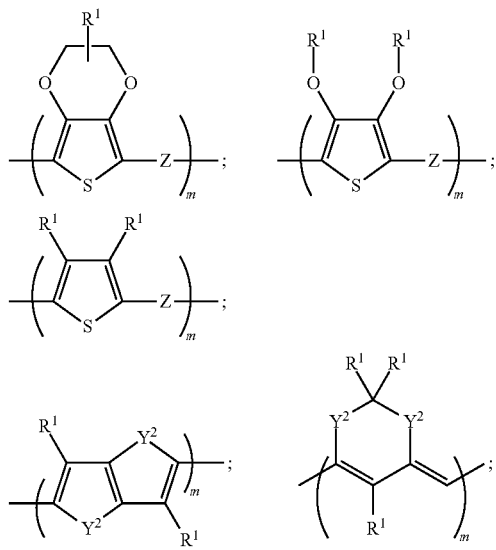

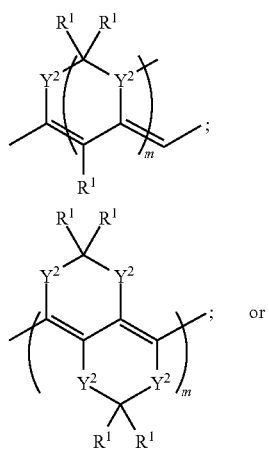

-continued

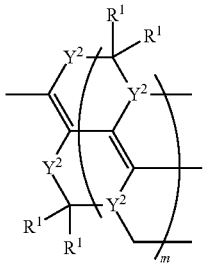

wherein $R^1$ of π independently comprises

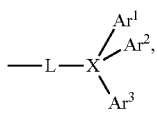

or is H, an alkyl group, a heteroalkyl group, an aryl group, or a hetero aryl group; L is a covalent linker; z is 1,2-vinylene, 1,4-phenylene, or 2,5-thiophenylene, $Y^2$ is S, O or $SiR^2_2$, where $R^2$ is aliphatic group, and m is 1-3. In some embodiments, X is C or Si In another embodiment, π includes:

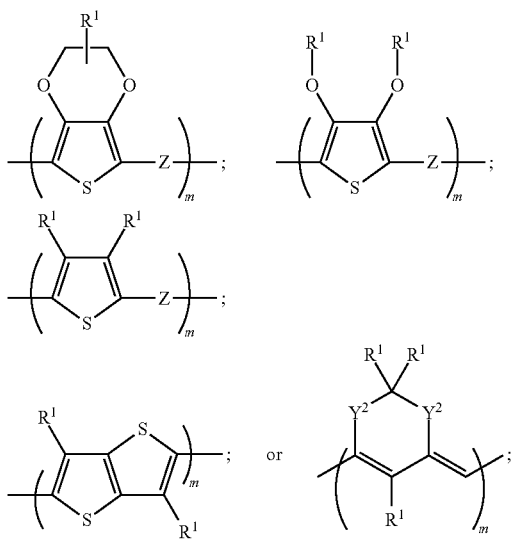

and A is:

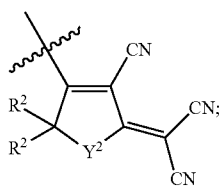

wherein: $R^1$ is independently at each occurrence an H, an alkyl group, or a halogen; Z is a single bond or —CH=CH—; $Y^2$ is O, S, —C($R^1$)$_2$—; $R^2$ is independently at each occurrence an alkyl group or an aryl group; and m=1-3. In embodiments, the nonlinear optical chromophore includes one of the structures shown in FIG. 1 wherein X, $R^1$, and $R^2$ may be as described above.

In another embodiment, A has the structure:

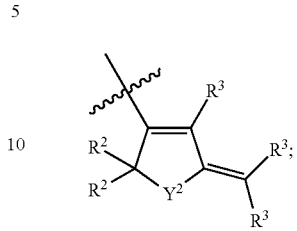

wherein: $R^2$, independently at each occurrence is H, an aliphatic group such as a branched or un-branched alkyl or alkoxy group, or a substituted or un-substituted aryl group. $R^3$, independently at each occurrence, is cyano, $CF_3$, nitro group, an ester group, a halogen, or a substituted or un-substituted aryl group; $Y^2$, is $CH_2$, O, S, N($R^2$), Si($R^2$)$_2$ or —C($R^2$)$_2$—. In another embodiment, at least one $R^1$ of π comprises

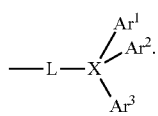

According to an embodiment, a nonlinear optical chromophore has the structure D-π-A, wherein D is a donor, π is a π-bridge, and A is an acceptor; and wherein at least one of D, π, or A is covalently attached to a substituent group including at least one of:

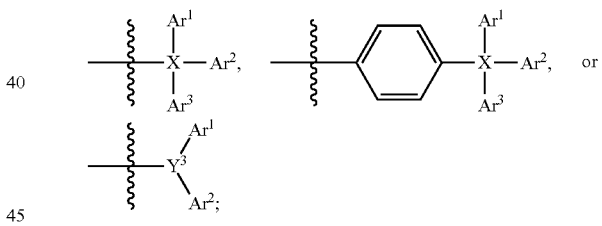

and wherein: X is C or Si; $Y^1$ is —C($R^1$)$_2$—, O, S, —N($R^1$)—, —N($R^1$)C(O)—, —C(O)$_2$—; $Y^3$ is N or P; and $Ar^1$, $Ar^2$, and $Ar^3$ are aryl groups. The aryl groups, D, π, and A may be, as described above for example.

Other embodiments include electro-optic composites and polymers including one or more of the nonlinear optical chromophores described above. Typically, the polymer is poled with an electric field to induce electro-optic activity. Other techniques such as self-organization or photo-induced poling may also be used. The nonlinear optical chromophore may be covalently attached to the polymer matrix (e.g., as in a side-chain polymer or a crosslinked polymer) or may be present as a guest in a polymer matrix host (e.g., a composite material). The nonlinear chromophore may also be present as guest in the polymer matrix and then be covalently bonded or crosslinked to the matrix before, during, or after poling. Polymers that may be used as a matrix include, for example, polycarbonates, poly(arylene ether)s, polysulfones, polyimides, polyesters, polyacrylates, and copolymers thereof.

In some embodiments, bulky groups on the chromophore are used to change the Tg and to reduce the optical loss of electro-optic (EO) polymers by changing the physical interaction between polymer host and chromophore guest. We found that the physical interaction between host polymer and guest molecular can be increased by selecting specific chemical structure of the isolating (e.g., bulky) group on the chromophore. Physical interactions may include, for example, pi-pi interactions, size interactions that block chromophore movement significantly below Tg (e.g., there is not enough free volume in the polymer composite at Tg for translation of the bulky group, and hence the chromophore, which is generally required for chromophore relaxation), and preorganized binding interactions where the bulky groups fit preferentially into conformationally defined spaces in the polymer, or any combination thereof. In some embodiment, the physical interactions are controlled or supplemented by van der Waals forces (e.g., Keesom, Debye, or London forces) among the moiety of the bulky groups and aryl groups on polymer chains. Such non-covalent interactions may increase temporal stability below Tg and decrease optical loss while improving chromophore loading density and avoiding the deleterious effects of crosslinking on the degree of poling-induced alignment.

Pi-pi interactions are known in the art and may include interaction, for example, between a pi-system and another pi-system (e.g., an aromatic, a heteroaromatic, an alkene, an alkyne, or carbonyl function), a partially charged atoms or groups of atoms (e.g., —H in a polar bond, —F), or a fully charged atom or groups of atoms (e.g., —NR(H)$_3^+$, —BR(H)$_3^-$). pi-interaction may increase affinity of the chromophore guest for the polymer host and increase energy barriers to chromophore movement, which is generally required for chromophore relaxation and depoling. In some embodiments, pi-interactions may be used to raise the Tg of a polymer (e.g., by increasing interactions between polymer chains) or the Tg of a polymer composite (e.g., by increasing interactions between the polymer host and the chromophore guest). In some embodiments, the pi-interactions of the bulky groups increase the Tg of the polymer composite compared to when pi-interacting moieties on the bulky groups are replaced with moieties that have no or weak pi-interactions. In some embodiments, pi-interacting groups on the chromophore are chosen to interact preferentially with pi-interacting groups on the polymer chain. Such preferential interactions may include, for example, pi-interacting donors/acceptors on the bulky group with complementary pi-interacting acceptors/donors of the polymer chain, or spatial face-to-face and/or edge-to-face interactions between pi-interacting groups on the chromophores and polymer chains, or any combination thereof. In some embodiments, multiple interactions such as a face-to-face and face-to-edge between one or multiple moieties on the chromophore bulky group with multiple or one moieties on the polymer chain may increase interaction strength and temporal stability. The pi-interactions between the aryl bulky group/s on the chromophore and the aryl groups on the polymer may be enhanced by complementary geometric dispositions of the aryl groups that enhance the pi interactions (e.g., aryl groups tetrahedrally disposed around a substituent center in the chromophore bulky group may favorably pi-interact (e.g., stack) more efficiently with aryl groups tetrahedrally disposed around a carbon in the polymer backbone as shown in a top view (FIG. 14A) and the side view (FIG. 14B, with partial pi-interactions shown) from rotating 90° around the x-axis). In other embodiments, the polymer may be chosen because the chain adopts certain conformations and spatial distributions (e.g., preorganization) of pi-interacting groups that favor face-to-face (FIG. 15A) or face-to-edge (FIG. 15B) interactions with the pi-interacting groups on the chromophore. Some embodiments may have multiple face-to-face interactions between pi-interacting groups on the polymer and the chromophore (e.g., FIG. 15C) or a combination of face-to-face and face-to-edge pi-interactions (e.g., FIG. 15D). In other embodiments, pi-interacting donors generally have electron rich p-systems or orbitals and pi-interacting acceptors generally have electron poor p-systems or orbitals. In some embodiments, the bulky groups on the chromophore have pi-interacting donors or pi-interacting acceptors that are complimentary to pi-interacting acceptors or pi-interacting donors on the polymer chain. In some embodiments, such pi-interacting acceptors may include, for example, heterocycles such as pyridines, pyrazines, oxadiazoles, etc, and pi-interacting donors may include, for example, heterocycles such as thiophene, furan, carbazole, etc. The pi-interacting donors/acceptors may also include aryl groups that are electron rich/poor from electron donating/withdrawing substituents. In some embodiments, the bulky group includes at least one pi-interacting acceptor complementary to a pi-interacting donor on the polymer chain. In some embodiments, the bulky group includes at least one pi-interacting donor complementary to a pi-interacting acceptor on the polymer chain.

In some embodiments, the size of the bulky groups prevents translation/depoling of the chromophore in the polymer free volume significantly (e.g., 20° C.) below the Tg of the composite. In some embodiments, the bulky group is substantially 3-dimensional (e.g., the bulky group has bulk-forming moieties tetrahedrally or trigonal bipyramidally disposed around a substituent center atom rather than having a substantially planar or linear arrangement of the bulk-forming moieties around the substituent center atom). Such 3-dimensionality may reduce the possibility of the bulky group, and hence the chromophore, form translating through free volume compared to a planar or linear bulky group. The bulk-forming groups may independently comprise, for example, and an organic moiety having 5 or more carbon atoms. In some embodiments, the bulk-forming groups may independently comprise conformationally rigidified structures such as rings. The rings may be aliphatic, aromatic, or any combination thereof. In some embodiments, the bulk-forming groups may independently comprise aryl groups (aromatics, polycyclic aromatics, substituted aromatics, heteroaromatics, polycyclic heteroaromatics, and substituted heteroaromatics.

In other embodiments, the bulky groups fit preferentially into conformationally/spatially defined areas (e.g., pockets) of the polymer. Such areas may be referred to as preorganized for interaction with the bulky groups. Such preorganization may result from the polymer backbone adopting a predetermined conformation or from groups (e.g., pendant groups) of the polymer adopting predetermined conformation. In some embodiments, the preorganized area of the polymer may have pi-interacting groups, pi-interacting atoms, shape-interacting groups, H-bonding groups, etc that are spatially disposed to preferentially interact with complementary moieties on the bulky group. The interactions of the preorganized area on the polymer and the bulky group may comprise any interaction described above or any multiple combinations thereof. In some embodiments, preorganization provides additional stability compared to just the stabilizing interaction alone. For example, one part of the preorganized pocket may pi-interact with a pi-interacting moiety on the bulky group and another part of the preorganized pocket may interact with the same or different moiety of the bulky group with van der Waals forces.

In other embodiments, the chromophore may comprise more than one bulky group. In some embodiments, the chromophore has at least one bulky group on the donor and at least one bulky group on the p-bridge or acceptor. More than one bulky group on different parts of the chromophore may increase interactions with the polymer backbone and make translation and depoling more difficult.

One embodiment comprises a poled nonlinear optical chromophore and a host polymer, wherein the nonlinear optical chromophore is substituted with two or more bulky groups and the host polymer is configured to cooperate with the bulky groups to impede chromophore depoling. In some embodiments, the nonlinear optical chromophore has the structure D-π-A; D is substituted with a bulky group; and π is substituted with a bulky group. In another embodiment, the bulky groups and the polymer cooperate via pi-interactions. I another embodiment, the bulky groups comprise aryl groups. In some embodiments, the aryl groups independently are an aryl hydrocarbon, an aryl polycyclic hydrocarbon, a heteroaryl, or a polycyclic heteroaryl. In some embodiments, the host polymer may be a polycarbonate, a poly(arylene ether), a polysulfone, a polyimide, a polyester, a polyacrylate, or any copolymer thereof. In some embodiments, the host polymer has a Tg greater than 150° C. and may be a polysulfone; a polyester; a polycarbonate; a polyimide; a polyimideester; a polyarylether; a poly(methacrylic acid ester); a poly(ether ketone); a polybenzothiazole; a polybenzoxazole; a polybenzobisthiazole; a polybenzobisoxazole; a poly(aryl oxide); a polyetherimide; a polyfluorene; a polyarylenevinylene; a polyquinoline, a polyvinylcarbazole; or any copolymer thereof.

Another embodiment is an electro-optic device comprising any of the polymers described herein, wherein the $V_{pi}$ of the device is operational after 2000 hours at 85° C. In some embodiments, the electro-optic device has a $V_{pi}$ that does not increase more than 5% after 2000 hours at 85° C. In some embodiments, the electro-optic device has a $V_{pi}$ that does not increase more than 10% after 2000 hours at 85° C. In some embodiments, the electro-optic device has a $V_{pi}$ that does not increase more than 15% after 2000 hours at 85° C. In some embodiments, the electro-optic device has a $V_{pi}$ that does not increase more than 20% after 2000 hours at 85° C.

In some embodiments, an electro-optic polymer comprises a nonlinear optical chromophore and a host polymer, wherein: the nonlinear optical chromophore has a bulky substituent comprising at least one aryl group and the host polymer has an aryl group selected to interact with the aryl group of the substituent. In some embodiments, wherein the substituent comprises 2 or 3 aryl groups. In some embodiments, the chromophore has the structure D-π-A and the triaryl group has the structure

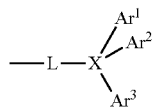

wherein: D is a donor; π is a π-bridge; A is an acceptor; X is a substituent center; $Ar^1$, $Ar^2$, and $Ar^3$ are the aryl groups; and L is a covalent linker attached to D, π, or A.

In another embodiment, an electro-optic polymer includes a nonlinear optical chromophore having the structure D-π-A, wherein D is a donor, π is a π-bridge, A is an acceptor, and at least one of D, π, or A is covalently attached to a bulky group comprising at least one aryl group, and wherein the electro-optic polymer has greater temporal stability than when an alkyl group is substituted for the aryl group. In some embodiments, the bulky group comprises at least two aryl groups, and the electro-optic polymer has greater temporal stability than when alkyl groups are substituted for the aryl groups. In another embodiment, the bulky group comprises at least three aryl groups, and the electro-optic polymer has greater temporal stability than when alkyl groups are substituted for the aryl groups.

Figure 14:
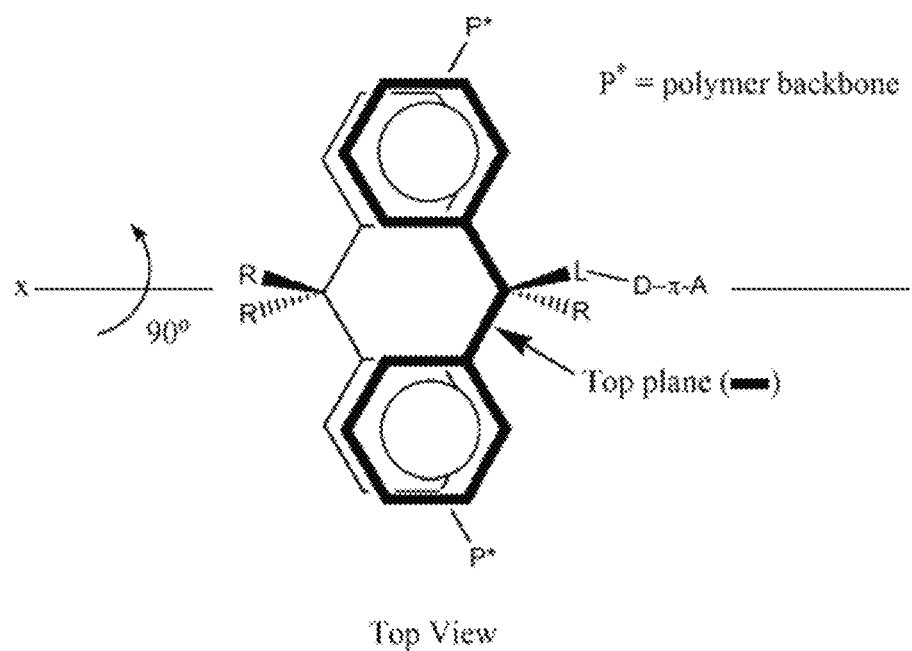
FIG. 14 illustrates pi-interactions according to some embodiments.
Figure 14:
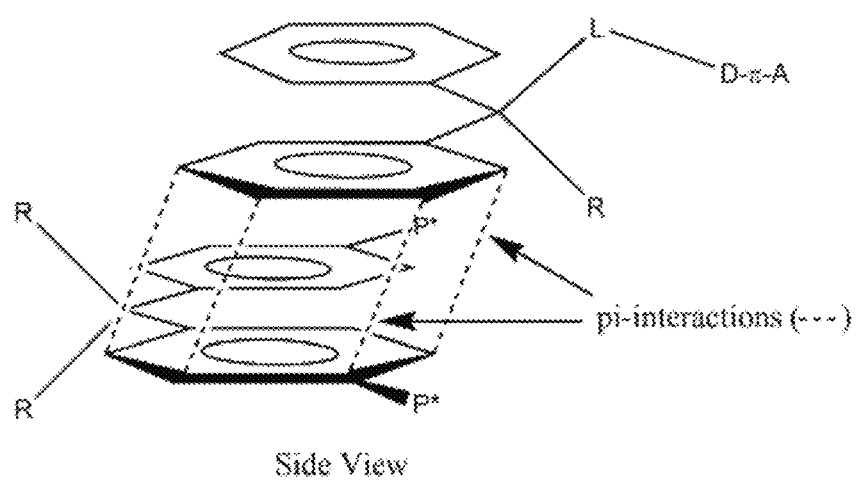

In another embodiment, an electro-optic polymer comprises a nonlinear optical chromophore and a host polymer, wherein the nonlinear optical chromophore has a substituent group comprising at least two aryl groups, the host polymer comprises a subunit comprising at least two aryl groups, and the aryl groups of the nonlinear optical chromophore align preferentially with the aryl groups of the subunit (e.g., the alignment shown in FIG. 14). In some embodiments, the host polymer is a polysulfone; a polyester; a polycarbonate; a polyimide; a polyimideester; a polyarylether; a poly(methacrylic acid ester); a poly(ether ketone); a polybenzothiazole; a polybenzoxazole; a polybenzobisthiazole; a polybenzobisoxazole; a poly(aryl oxide); a polyetherimide; a polyfluorene; a polyarylenevinylene; a polyquinoline, a polyvinylcarbazole; or any copolymer thereof.

Compatibility and stability of composites comprising chromophores having bulky groups with various host polymers were studied, including the EO properties. Low optical loss is achieved due to good compatibility, which also is proven by a clean, single Tg transition. EO coefficients with various host polymers are characterized and their temporal stability is monitored at different temperatures. Meanwhile, modulators were fabricated out of those EO composites and their stability is further confirmed.

Some embodiments have a chromophore structure that comprises bulky groups. Such chromophores show good compatibility with host polymers and lead to high glass transition temperature. Examples of two chromophores are shown in FIGS. 1-4. Guest-host systems were studied using these chromophores with various host polymers with different glass transition temperature. Host polymers such as 28, 29, and 30 in FIG. 6 belong to polycarbonate family with low to high Tg. In some embodiments, high Tg of the host polymers will lead to higher Tg of the EO composites with the same chromophore.

According to embodiments, EO composites having high Tg (>120° C.) may be fabricated by using a host polymer with a glass transition temperature >120° C. In other embodiments, EO composites having high Tg (>120° C.) may be fabricated by using a host polymer with a glass transition temperature >120° C. and a chromophore with a melting point or Tg >120° C. For example, an EO composite including chromophore 23b (FIG. 4) in 28 (Tg=286° C.) to have a composite Tg of 167° C. Similarly, results showed an EO composite including 23b chromophore in host polymer 29 (Tg=165° C.) to have a composite Tg of 193° C. Both systems showed improved stability for long term applications having a maximum service temperature of 85° C. Chromophore 23a has similar improved stability (Tables 1 and 2 below). In another embodiment, an electro-optic composite comprises greater than 35% loading by weight of a chromophore in a host polymer, wherein the Tg of the composite is higher than the melting point, or Tg, of the chromophore itself. In some embodiments, the chromophore loading by weight is at least 45% and the Tg of the composite is greater than 150° C. In another embodiment, the host polymer may be a semi-crystalline polymer with a low Tg that, when mixed with a chromophore, forms an amorphous composite with high Tg. In some embodiments, noncovalent interactions between bulky groups on the chromophore and moieties of the semi-crystalline host polymer increase the Tg of the amorphous composite.

According to embodiments, other host polymers with Tg higher than 150° C. may be used in combination with chromophores having bulky groups to produce composite EO materials having high Tg, and therefore high temperature stability over short and/or long terms. Illustrative high Tg host polymers may be formed from the following polymeric systems and/or their combinations: polysulfones; polyesters; polycarbonates; polyimides; polyimideesters; polyarylethers; poly(methacrylic acid esters); poly(ether ketones); polybenzothiazoles; polybenzoxazoles; polybenzobisthiazoles; polybenzobisoxazoles; poly(aryl oxide)s; polyetherimides; polyfluorenes; polyarylenevinylenes; polyquinolines, polyvinylcarbazole; and their copolymers.

According to an embodiment, an electro-optic polymer includes a nonlinear optical chromophore having the structure D-π-A, wherein D is a donor, π is a π-bridge, A is an acceptor, and at least one of D, π, or A is covalently attached to a substituent group including a substituent center X that is directly bonded to an aryl group, and wherein the electro-optic polymer has greater temporal stability than when an alkyl group is substituted for the aryl group. The electro-optic polymer may be a side-chain, crosslinked, dendrimeric, or composite material. According to an embodiment, the substituent center X is bonded to at least three aryl groups, and the electro-optic polymer has greater temporal stability than when alkyl groups independently are substituted for the aryl groups. According to an embodiment, the electro-optic composite has greater than 80% temporal stability at 85° C. after 100 hours.

Other embodiments include various methods for making electro-optic composites, and devices therefrom, where the electro-optic composite includes a chromophore as described above. According to an embodiment, a method includes: a) providing a polymer including a nonlinear optical chromophore having the structure D-π-A, wherein D is a donor, π is a π-bridge, A is an acceptor, and at least one of D, π, or A is covalently attached to a substituent group including a substituent center that is directly bonded to an aryl group; and b) poling the polymer to form and electro-optic polymer, wherein the electro-optic polymer has greater temporal stability than when an alkyl group is substituted for the aryl group.

Typically, an aryl group is sterically larger than an alkyl group. Typically, the polymer may be provided as a film by, for example, spin deposition, dip coating, or screen printing. The thin film may also be modified into device structures by, for example, dry etching, laser ablation, and photochemical bleaching. Alternatively, the polymer may be provided by, for example, molding or hot embossing a polymer melt. The poling may include, for example, contact or corona poling. In another method embodiment, the substituent center is bonded to or substituted with at least three aryl groups, and the electro-optic polymer has greater temporal stability than when alkyl groups independently are substituted for the aryl groups.

In some embodiments, the polymer is a composite. In some method embodiments, the aryl group is sterically larger than the alkyl group. In another method embodiment, the polymer has a $T_g$; the $T_g$ of the polymer is within approximately 5° C. compared to when an alkyl group is substituted for the aryl group, and the temporal stability of the polymer is greater compared to when an alkyl group is substituted for the aryl group.

Figure 5:
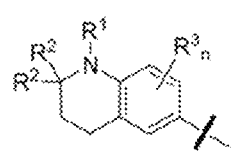
FIG. 5 illustrates a donor and a synthetic scheme for chromophore having the donor according to an embodiment.
Figure 5:
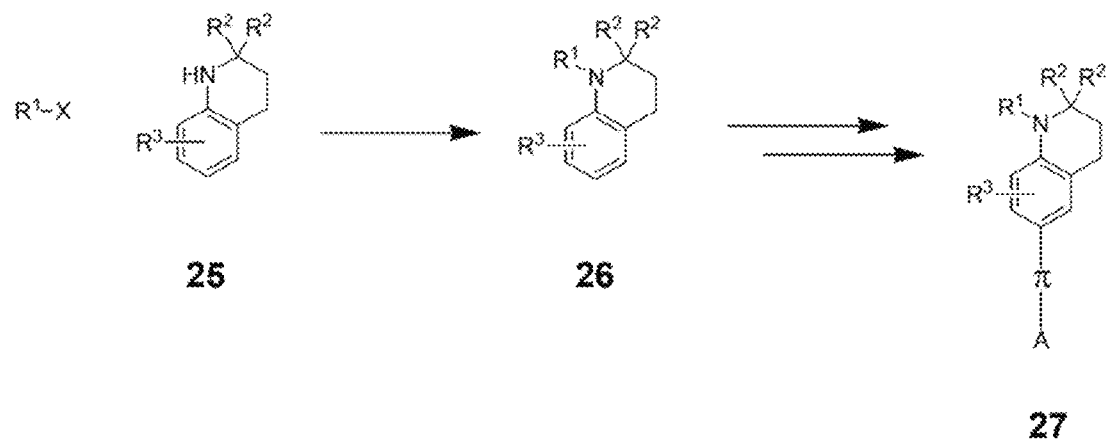

Another embodiment is an electro-optic polymer comprising a nonlinear optical chromophore comprising the donor (24, FIG. 5):

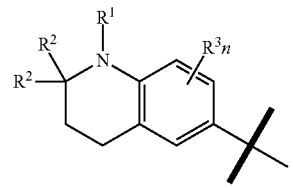

wherein $R^1$ independently comprises and alkyl, heteroalkyl, aryl, or heteroaryl group; $R^2$ independently at each occurrence comprises an H, alkyl group, heteroalkyl group, aryl group, or heteroaryl group; $R^3$ independently at each occurrence comprises a halogen, an alkyl group, and heteroalkyl group, an aryl group, or a heteroaryl group; and n is 0-3. Chromophores according to this embodiment may be prepared, for example, according to the general scheme 25 to 27 shown in FIG. 5. Chromophore according to this embodiment have good nonlinearity due to the strong donating group and can be derivatized with a number of functional groups at the —$R^1$ position. In one embodiment, —$R^1$ comprises a bulky group that interactions with the polymer host and the π-bridge includes a bulky group that interacts with the polymer host.

Other embodiments are electro-optic devices including the nonlinear optical chromophores, electro-optic composites, and electro-optic polymers as described above. The devices may include planar waveguides, free standing thin films, single and multi-mode optical waveguides, and other polymers that are passive (e.g., clad polymers such as acrylates). The devices may also have polymers having combinations of any one of the chromophores and/or with other nonlinear optical chromophores. Additionally, a particular device may have two or more different composites and/or polymers including any one of the chromophores above (e.g., a electro-optic waveguide core polymer having one chromophore with a relatively high refractive index and a clad polymer having either the same chromophore in less concentration or a different chromophore so that the refractive index of the clad is lower). In some embodiments, the electro-optic device includes a Mach-Zehnder interferometer, a Michelson interferometer, a micro-ring resonator, or a directional coupler.

EXAMPLES

Figure 2:
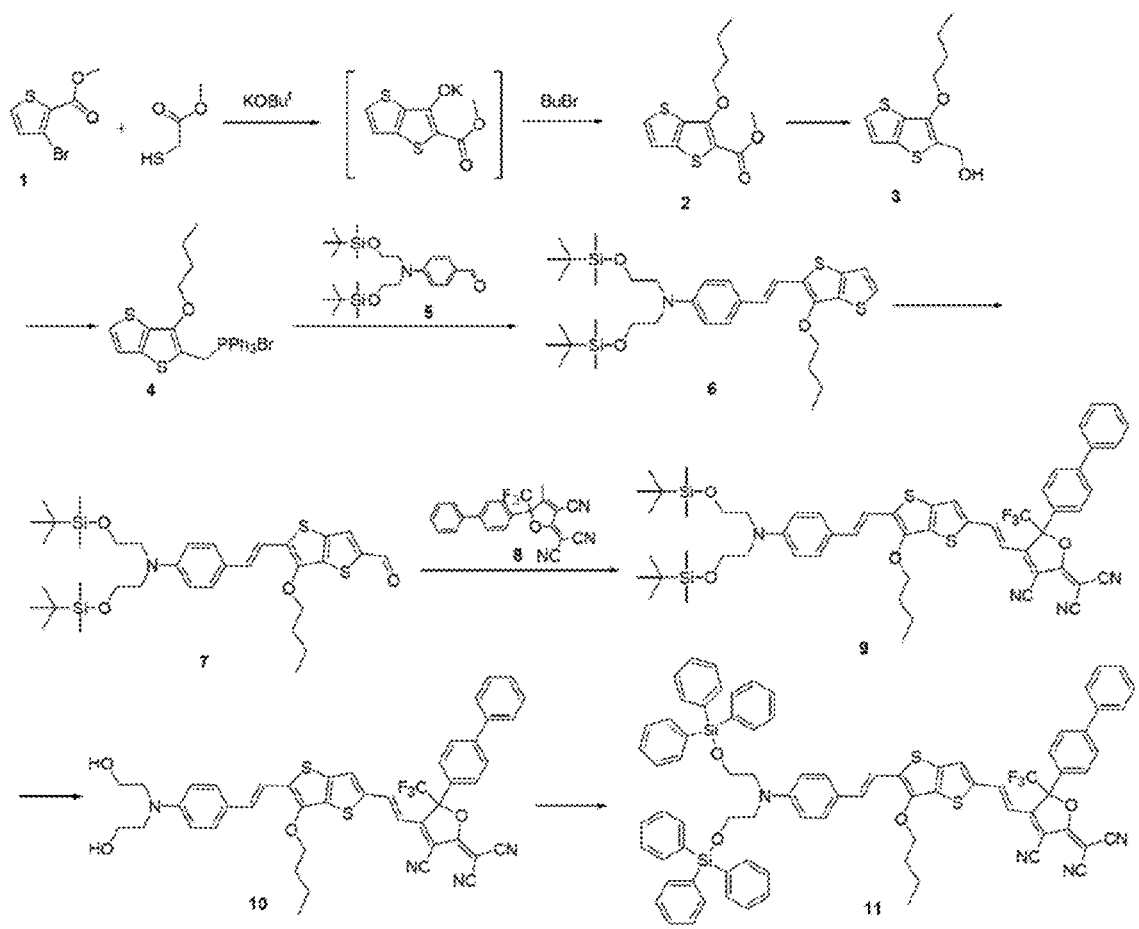
FIG. 2 illustrates the synthesis of a chromophore according to an embodiment.

The following synthetic example refers to FIG. 2.
Compound 2:
To compound 1 (10.00 grams) in dioxane (50 ml) in ice bath was added t-BuOK (1M, 55 ml) and Methyl thioglycolate (5.279 grams). The reactants were heated to 80° C. for 2 hours and then to 120° C. for 30 min. Then, most of dioxane was distilled off. 1-Bromobutane (20 ml) and DMSO (80 ml) was added. The reaction was heated to 150° C. for 2 hours. After the reaction was cooled to room temperature, acetic acid in ice water was used to acidify the reaction. The product was extracted with dichloromethane. The dichloromethane layer was separated, dried over $MgSO_4$, filtered, and evaporated to give crude product, which was purified by column chromatography on silica gel to give 10.7 grams of liquid product 2.

Compound 3:
Compound 2 (7.72 grams) was dissolved in dry ether under nitrogen. The flask was cooled in dry ice-acetone cooling bath. LiAlH$_4$ (1.08 grams) was added. The cooling bath was removed so that the reaction temperature was brought to room temperature, at which the reaction was kept for 6 hours. The flask was cooled in ice bath. Methanol was added drop-wise to quench the reaction. Brine was added. The organic layer was separated. The aqueous layer was extracted with ether. The combined organic layers were dried over MgSO$_4$, filtered through silica gel packed in funnel. After evaporation, compound 3 was obtained in 4.65 grams.

Compound 4:

Compound 3 (4.65 grams) was dissolved in chloroform (100 ml). The flask was cooled in ice bath while triphenylphosphine hydrobromide was added. The reaction was stirred at 0° C. for 30 min, then room temperature for 14 hours, then refluxed for 3 hours. The reaction mixture was precipitated in ether two times to give 8.93 g of product 4.

Compound 6:

Compound 4 (6.71 grams) and compound 5 (5.22 grams) were mixed in dry THF (100 ml) under nitrogen and cooled in an ice bath. t-BuOK (1M in THF, 15 ml) was dropped into the mixture via needle. The reaction was stirred at room temperature overnight and quenched with water. The mixture was neutralized with acetic acid. The product was extracted with methylene chloride and purified by flash column using a hexane-methylene chloride mixture to give 3.10 grams of compound 6.

Compound 7:

Compound 6 (1.68 grams) was dissolved in dry THF (35 ml) under nitrogen. n-BuLi (2.5M, 1.15 ml) was dropped in via needle at −78° C. The reaction was kept at −30° C. for 70 min. Then, DMF (0.30 ml) was added via needle at −78° C. After 45 min, the reaction was terminated with ice water. The product was extracted with methylene chloride, dried over MgSO$_4$, evaporated, and purified by flash column to give compound 7 (1.32 grams).

Compound 9:

Compounds 7 (1.264 grams) and 8 (0.767 grams) (see U.S. Pat. No. 7,078,542 and references therein for preparation of acceptor compounds of this type) were mixed in 10 ml ethanol and 5 ml dry THF under nitrogen. The mixture was heated to 45° C. The reaction was monitored by TLC. When compound 7 disappeared from reaction mixture, the solvent was evaporated on rotary evaporator. The residue was purified by flash column and precipitation of methylene chloride solution in methanol to give 1.03 grams of compound 9 as black powder. U.S. Pat. No. 7,078,542 is incorporated by reference herein.

Compound 10:

A total of 5.69 grams of 9 was dissolved in THF (100 ml) under nitrogen. 5 ml of 2N HCl was added. The reaction was stirred at room temperature and monitored by TLC. When the compound 9 disappeared from the reaction mixture, methylene chloride (200 ml) and brine (100 ml) was added. The mixture was neutralized with saturated sodium bicarbonate solution. The organic layer was separated, dried over MgSO$_4$, evaporated, and purified by flash column successively to give 5.69 g of compound 10.

Compound 11:

Compound 10 (5.68 grams) was mixed with methylene chloride (50 ml). The flask was cooled in ice bath. triphenylchlorosilane (6.10 grams) and imadazole (1.40 grams) was added successively. The reaction was stirred and monitored by TLC. After about 30 minutes, compound 10 disappeared from the reaction mixture. The salt was filtered out. The product was purified by flash column and precipitation of methylene chloride solution in methanol to give 4.10 grams of compound 11.

Other chromophores were prepared using similar reactions and other starting materials. For example, when X=C, trityl chloride (Ph$_3$C—Cl) may be used in a reaction analogous to that for compound 11.

30 wt % of compound 11 in APC (APC=[biphenyl A carbonate-co-4,4'-(3,3,5-trimethylcyclo-hexylidene)diphenol carbonate] (28), see U.S. Pat. No. 6,750,603) showed very good EO activity of $r_{33}$=81 pm/V and very good temporal stability of 92% retention after 20 hours at 85° C. Temporal stability tests on a Mach-Zehnder modulator showed better than 95% retention of $V_{pi}$ after 100 hours at 85° C.

Figure 3:
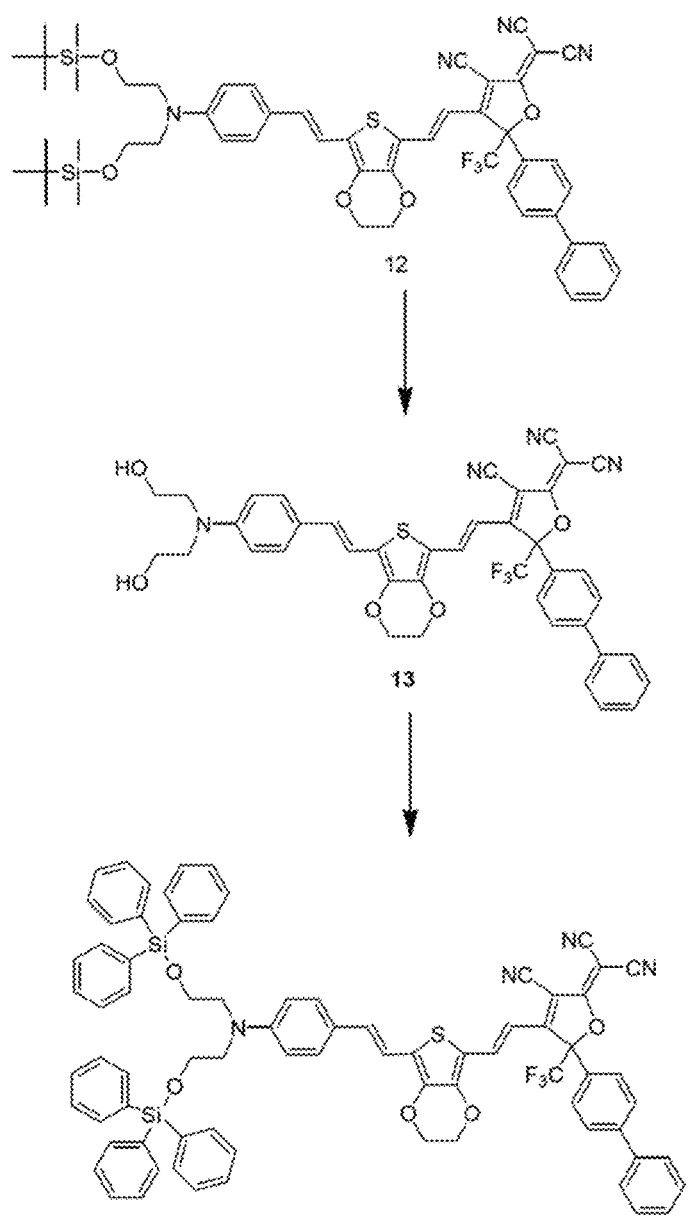
FIG. 3 illustrates the synthesis of a chromophore according to an embodiment.
Figure 4:
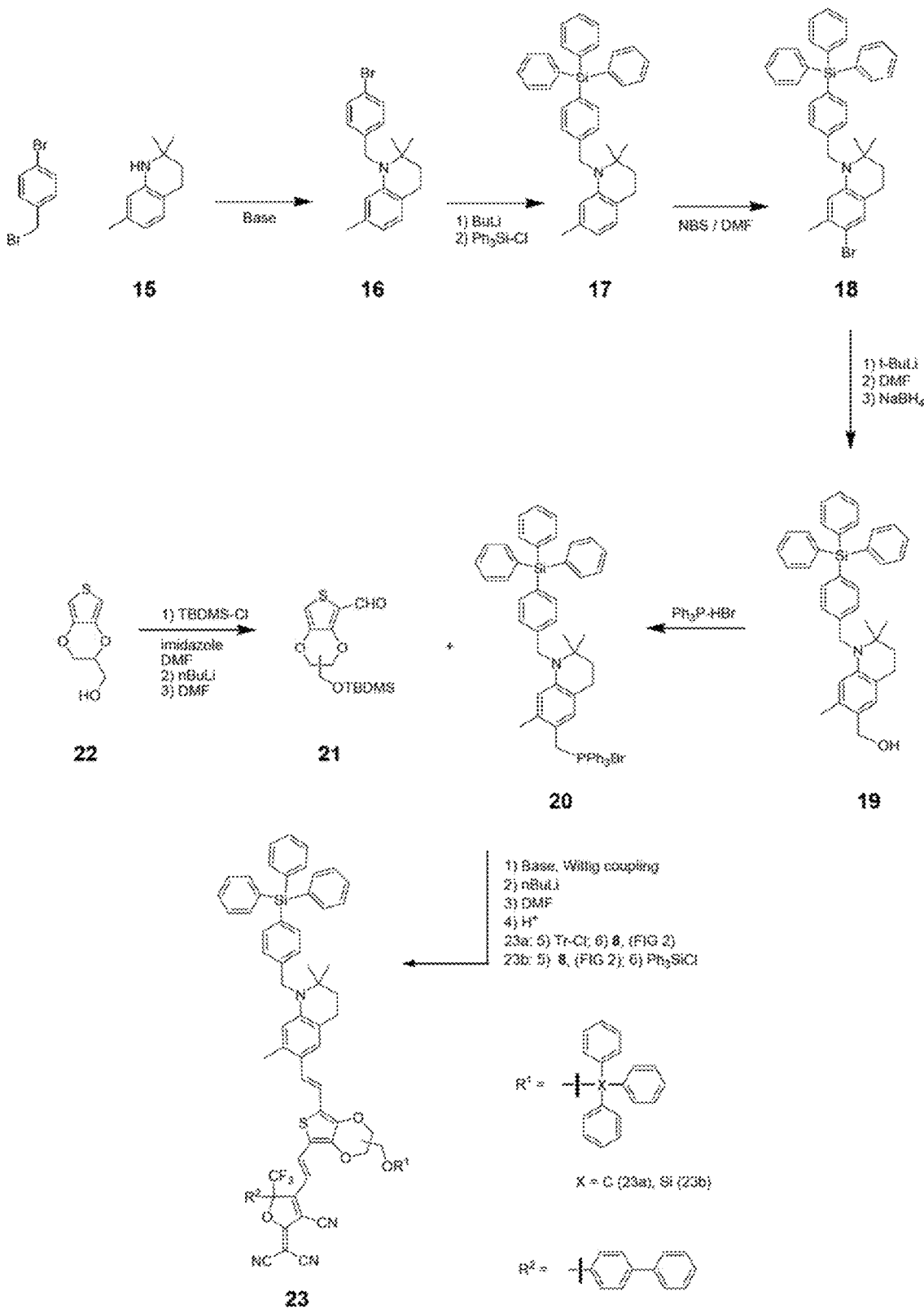
FIG. 4 illustrates the synthesis of chromophores according to an embodiment.

The following synthetic example refers to FIG. 3.

Compound 13:

Compound 12 was dissolved in 70 mL THF while 1N HCl solution (20 mL) was added. It was stirred at room temperature for 2 hours. The mixture was extracted with CH$_2$Cl$_2$, washed with NaHCO$_3$ solution and water, and dried over MgSO$_4$. After evaporating solvent under reduced pressure, it was purified by column chromatography with CH$_2$Cl$_2$/MeOH (5/0.5) as eluting solvents. At total of 1.65 g of compound 13 was obtained in 67% yield.

Compound 14:

Compound 13 (0.8 g, 1.07 mmol) and triphenylsilyl chloride (0.945 g, 3.2 mmol) were dissolved in 20 mL of CH$_2$Cl$_2$. After immidazole (0.22 g, 3.2 mmol) was added, the mixture was stirred at room temperature for 1.5 hours. It was then filtered and the solvent was removed under reduced pressure. It was purified by column chromatography to give compound 14 as a solid.

A 50% compound 14 in amorphous polycarbonate (APC) composite had an $r_{33}$ of 90 pm/V, an optical loss of 0.881 dB/cm, a $T_g$ of 140° C., an index of refraction of 1.6711 at 1.55 microns, and a temporal stability in Mach-Zehnder modulators similar to 30% compound 11 in APC as described above. A 24% compound 12 in APC composite, in which the aryl groups are substituted (replaced) with alkyl groups, had an $r_{33}$ of 50 pm/V, an optical loss of 1.44 dB/cm, $T_g$ of 140° C., an index of refraction of 1.6038 at 1.55, and a much lower temporal stability.

Compound 16:

To a 3-L three necked flask with a stir bar was charged 125 grams of trimethyl-tetrahydroquinoline (15), and 102 grams of anhydrous potassium carbonate (K$_2$CO$_3$). Set the flask with a condenser, and an additional funnel containing 173.3 grams of p-bromobenzyl bromide in 500 ml dry DMF. The air in flask was flash with nitrogen. 700 ml of dry DMF was added to flask. The flask was cooled in ice-water bath. p-bromobenzyl bromide was dropped into the flask from the additional funnel attached to flask while stirring is on. After completion of the addition, the reaction was kept at room temperature for 3 hours. The reaction was heated in 55-60° C. for 14 hours (overnight). The content was allowed to cool down to room temperature, 1 liter of hexanes was added to flask. After stirring for 10 min, the solid was filtered off. The solution was evaporated on rotary evaporator to dryness. The mixture was dissolved in ethyl acetate (1 L), washed with brine two times, dried over MgSO4, filtered, and evaporated. The product was purified by chromatography on silica gel packed in chromatographic column with hexanes/DCM as mobile phase.

Compound 17:

A 2-l flask equipped with additional funnel and stir bar was charged with 66.66 grams of compound 16 from previous step. The flask was degassed and filled with dry nitrogen. Anhydrous THF (800 ml) was added into flask. The flask was cooled in dry ice-acetone bath. n-BuLi (83 ml) was added from the additional funnel slowly. The reaction was kept at −60° C. for 2.5 hours. In another 3-liter 3-necked flask with 55.7 grams of triphenylchlorosilane and 200 ml anhydrous THF was prepared and cooed in dry ice-acetone bath. Under stirring, the lithiated solution from the first flask was added into the second flask with stirring during 1 hour. The reaction was stirred overnight and was quenched with acetic acid aqueous solution (0.19 mol acetic acid in 300 ml water) and some brine solution. The organic layer was separated and washed with brine once, dried over MgSO4, filtered, and evaporated to dryness. The product was purified by silica gel columns using hexanes/DCM as mobile phase.

Compound 18:

147 grams of compound 17 was dissolved in 1000 ml of dry DMF in a 3-L flask under nitrogen. NBS (51.23 grams) together with 500 ml of DMF was charged in an additional funnel. The flask was cooled in ice bath and wrapped with aluminum foil to keep light from the reaction. Te NBS solution was dropped into LM-667 drop wise. The reaction was stirred at room temperature overnight. DMF was evaporated. The mixture was stirred in Hexanes/ethyl acetate (3:1). The precipitation was filtered off. The solution was evaporated. The residual mixture was stirred in methanol. The solid was collected by filtering. Repeat the methanol wash one more time. The solid was purified by silica gel column chromatography (Hexane/DCM=2:1) and dried under vacuum. Yield of compound 18 is 95%.

Compound 19:

150 grams of compound 18 was charged into a 3-l 3-necked flask with a stir bar and additional funnel. The flask was flashed with nitrogen 4 times. 1200 ml of anhydrous THF was added via cannulation. The flask was cooled in dry ice-acetone bath. 286 ml of t-BuLi (1.7M) was added drop wise from the additional funnel. After completion of dropping, the funnel was washed with 25 ml of THF. Then, DMF (anhydrous, 35.81 g) in THF (200 ml) was added drop wise from the funnel. The cooling bath was removed to allow the reaction temperature to reach 0° C. in ice bath-water bath. The reaction was quenched with acetic acid aqueous solution (5:1) until PH value is about 7. Some brine and 500 ml of hexanes were poured into the mixture. The organic layer was separated, dried over MgSO4, filtered, and evaporated. The product was purified by silica gel column chromatography using hexane/DCM (3:1 to 1:1) and methanol wash. Yield of the corresponding aldehyde was 85%. The aldehyde (27.8 grams) was charged into a 1 liter flask with a stir bar. Dry THF (500 ml) was added. The mixture was stirred with some heat to form homogenous solution. The flask was cooled in ice bath. 1.86 grams of sodium borohydride (NaBH4) was added. The flask was flashed with nitrogen. 25 ml of ethanol in 50 ml THF was added from an additional funnel during two hours. The reaction was kept stirring at room temperature for 18 hours. The reaction is reached full conversion when the solution is near clear. When the reaction is finished, brine (50 ml) was added to the reaction and kept stirring for 45 min under high speed. The organic layer was separated, dried over MgSO4, evaporate. The product was purified with flash column chromatography using hexanes/ethyl acetate. The yield of compound 19 is 95%, which was used directly for next step without further characterization.

Compound 20:

A total of 25 grams of compound 19 was dissolved in chloroform (200 ml) in a 1-L flask. The flask was cooled in ice bath. $Ph_3PHBr$ (15.2 g) dissolved in chloroform (200 ml) was dropped into LM-671 during 1 hour or so. After stirring at room temperature for 3 hours, the reaction was reconfigured with Deans-Stark reflux trap to separate water by azeotropic removing chloroform-water distillate for 6 hours. The reaction was cooled down, evaporated to about 100 ml solution. This thick solution was precipitated in dry ethyl ether while stirring is on. The product collected by filtering was dissolved in DCM and precipitated again in dry ether. The greenish product was dried over vacuum for a day. Yield of compound 20 is 85%. Proton NMR was collected for characterize the compound structure.

Compound 21:

A Total of 0.1 mol of compound 22 in 200 ml dry dichloromethane in a flask was cooled in ice water. Imidazole (0.15 mol) was added. The flask was flashed with nitrogen. t-butyldimethylchlorosilane was added dropwise using syringe. The reaction was stirred for 1 hour. The precipitation was filtered out. The solution was washed with brine, dried over magnesium sulfate and evaporated. The product 10 was purified by flash chromatography over silica gel. The yield of the corresponding TBDMS ether is 85%. The TBDMS ether (8.37 g) was charged in a flask with a stir bar. The flask was degassed and refilled with nitrogen. n-Buli in hexane was added dropwise from a needle. The reaction was kept between −10° C. and −20° C. for 2 hours. Then DMF was added at −78° C. The reaction was quenched by acetic acid in water. The organic layer was separated, washed with brine, dried over magnesium, and evaporated. The product mixture of two regioisomers was purified by chromatographic column. The yield of compound 21 is 60%.

Compound 23:

To a flask, compound 20 (27.01 g) was charged and degassed. Dry THF was added to the flask. n-BuLi in hexane was added dropwise at −20° C. The reactants were stirred in ice bath for 1 hour. To a second flask, compound 21 (9.511 g) was dissolved in dry THF. The mixture in flask one was added to the second flask under cooling and stirring. The mixture was stir 16 hour at room temperature. The reaction was stop by adding water and some brine. The organic layer was separated, dried over magnesium sulfate, filtered, and evaporated to dryness. The mixture was purified by flash chromatography to give the corresponding Wittig coupling product in a yield of 66%. The coupling product was dissolved in dry THF in a flask with a stir bar. n-Buli in hexane was added using syringe. The reaction was kept at −20° C. for 2 hours. DMF in THF was added. The reaction was quenched by brine and acetic acid. The organic layer was separated, washed with water, dried over magnesium sulfate, filter using Buchner funnel. The mixture was purified by silica gel column chromatography using dichloromethane-hexane mixture as mobile phase to give the corresponding aldehyde. The aldehyde was dissolved in acetone in a flask under nitrogen. 3N HCl aqueous solution was added. The mixture was stirred at room temperature and monitored by TLC. When the reaction reached the end. The mixture was neutralized with saturated sodium bicarbonate solution. Acetone was evaporated. The product was extracted with THF and purified further by flash column chromatography using THF-DCM as mobile phase to give the corresponding deprotected alcohol. (23a): The deprotected alcohol in a flask was dissolved in dry dichloromethane. Trityl chloride, diisopropylethylamine, 4-dimethylaminopyridine was added. The reaction was stirred for 16 hours. The precipitation was filtered. The solution was washed with water, dried with magnesium sulfate, filtered, and evaporated. The product was purified with flash chromatography to give the corresponding trityl ether. The trityl ether and 2-dicyanomethylene-3-cyano-4-methyl-5-trifluoromethyl-5-(4'-phenyl)phenyl-2,5-dihydrofuran (8, FIG. 2) were mixed in ethanol in a flask. The reaction was heated at 60° C. for 6 hours. The content was cooled to room temperature. The mixture was filtered. The filtrate was purified by column chromatography combined with methanol or ethanol washed to give chromophore compound 23a; (23b) The deprotected alcohol and 2-dicyanomethylene-3-cyano-4-methyl-5-trifluoromethyl-5-(4'-phenyl)phenyl-2,5-dihydrofuran (8, FIG. 2) were stirred in ethanol in a flask under nitrogen at 60° C. The reaction was monitored by TLC. After 6 hours, the content was cooled to room temperature. The dark solid was collected by filtration on Buchner funnel. The material was further purified by silica gel column chromatography and re-crystallization to give a black powder of the chromophore-alcohol with a yield of 60%. The chromophore-alcohol was dissolved in dry dichloromethane in a flask with a stir bar. Imidazole and triphenylchlorosilane was added. The reaction was monitored by thin layer chromatography. After 30 min. the precipitation was filtered. The solution was washed with brine, dried over magnesium sulfate, filtered, and evaporated. The compound was further purified by flash column chromatography, crystallization and wash with hexanes. Yield of compound 23b is 70%.

Figure 6:
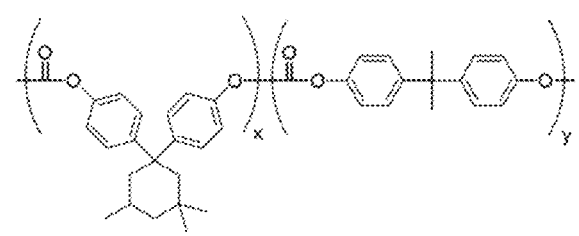
FIG. 6 illustrates polymers according to certain embodiments.
Figure 6:
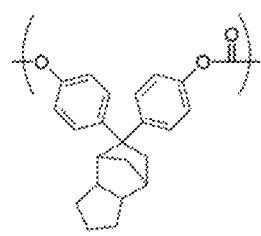
Figure 6:
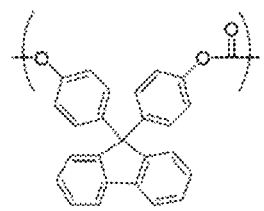

Guest-host EO polymers were prepared with chromophores 23a and 23b with host polymers 28-30 (FIG. 6). The properties of the EO polymer are shown in Table 1 and Table 2. The number in parentheses behind the material reference numbers is the loading % by weight of the chromophore. High Tg of host polymers will lead to higher Tg of the EO composites with the same chromophore. In Table 1 and Table 2, composites with 29 show higher Tg than 28 composites with the same loading. The composites have similar optical loss and EO coefficient.

TABLE 1

Major EO properties of chromophore 23a.

| Property | 28-23a (50%) | 28-23a (55%) | 29-23a (50%) | 30-23a (55%) |
|---|---|---|---|---|
| $r_{33}$ @ 1.3 μm (pm/V) corrected | 92 | 95 | 90 | High leak through current |
| Optical Loss @ 1.55 μm (dB/cm) | 1.1-1.2 | 1.2-1.3 | 1.3 | 1.4 |
| Chromophore $T_g$ (° C.) | 159 | 159 | 159 | 159 |
| EO Polymer $T_g$ (° C.) | 175 | 174 | 199 | >202 |
| Refractive Index @ 1.5 μm (TM) (poled) | 1.7141 | 1.7300 | 1.7116 | 1.6793 (unpoled) |

TABLE 2

Major EO properties of chromophore 23b

| Property | 28-23b (50%) | 28-23b (50%) | 29-23b (55%) | 30-23b (55%) |
|---|---|---|---|---|
| $r_{33}$ @ 1.3 μm (pm/V) corrected | 87-107 | — | 80-95 | — |
| Optical Loss @ 1.55 μm (dB/cm) | 1.2-1.3 | 1.3 | 1.3 | 1.3 |
| Chromophore $T_g$ (° C.) | 157 | 157 | 157 | 157 |
| EO Polymer $T_g$ (° C.) | 167 | 199 | 193 | — |
| Refractive Index @ 1.5 μm (TM) (poled) | 1.7339 | 1.6625 (unpoled) | 1.7320 | 1.6793 (unpoled) |

To study the long-term stability of EO polymers, accelerated aging tests have been performed. In these tests the EO polymer films were poled using Indium Tin Oxide (ITO) as substrate. The poled samples were then sealed in a vacuum environment to avoid the possible oxygen related degradation and placed into ovens set at various elevated temperatures. The decay of the EO coefficient $r_{33}$ was monitored as a function of time up to 2000 hours. EO polymer composite 28-23a (50%) (Tg 175° C.) was studied at 85, 100, and 110° C. (FIG. 7A). At 85° C., $r_{33}$ remained at 94% of the initial $r_{33}$ after 2000 hours of testing. We also studied 28-23b (55%) and 29-23b (55%) at 85° C., 100° C., and 110° C. (FIG. 7B, 7C, 7D, respectively). The Tg of 28 and 29 is respectively 167° C. and 193° C. The graphs FIG. 7B-D show normalized tested $r_{33}$ values at aging times up to 1800 hours at each temperature. In FIG. 7b, a 29 composition showed stability marginally better than the 28 composition. The difference in stability is relatively small because of the large temperature difference between their respective Tg and the 85° C. test conditions. At 100° C. (FIG. 7C), the 29 system had 2.5% better stability than the 28 system. At 110° C. (FIG. 7D), the 29 system showed 9% better stability than the 28 system. The 29 system was found to have higher temporal stability than the 28 system at each temperature, with the difference in stability being more marked at higher application temperatures. The effect of the higher host polymer Tg was to significantly enhance the composite Tg, and hence to enhance the stability of the measured EO coefficient.

Among different models proposed in the literature we discovered that one, incorporated by reference herein, published by Lindsay et al., *Polymer* 48 (2007), 6605-6616 showed good consistency between the experimental data and model prediction and is most relevant to our work. We applied the isothermal aging model Jonscher equation $$V_{pi}(t)/V_{pi}(0)=1+(t/\tau)^j$$

together with Lindsay's hyperbolic tangent approach:

$$ln(\tau/\tau_P)=E_R(1+\tan h[(T_c-T)/D])/2RT+E_P/RT$$

to model the temperature dependence of the relaxation and to derive the activation energy of our poled EO polymer systems. In the model, $E_R$ and $E_P$ are the activation energies of the rigid glassy state and the pliable state, respectively. $T_c$ and D are the central temperature and the width of the transition zone.

The experimental data and the curve fitting results using the Jonscher equation for 28-23a (50%) at three different temperatures 85, 100 and 110° C. are shown in FIG. 7E. It can be seen that there is a good consistency between our experimental data and the modeling results. Based on the Jonscher equation fitting, we obtained the fitting parameters τ (time constant) and j (the exponent) for all five temperatures tested. We then used these T and j to further extrapolate the $r_{33}$ decay (or $V_{pi}$ increase) of our EO materials at 25 years. FIG. 7B shows the extrapolation of the normalized $V_{pi}$ increase in 25 years for 28-23a (50%) at 85, 100 and 110° C. Under 85° C. operation, the model predicts a $V_{pi}$ increase of only 1.14 times. This is a significant improvement in the long-term stability compared to other existing EO polymer systems such as CLD-PI (80° C., FIG. 7B) reported in Lindsay.

We also show the curve fitting results using the hyperbolic tangent model (FIG. 8):

$$ln(\tau/\tau_P)=E_R(1+\tan h[(T_c-T)/D])/2RT+E_P/RT$$

proposed in Lindsay for EO polymers 28-14 (50%), 28-23a (50%), 28-23b (55%), and 29-23b (55%). For comparison purposes, we also re-plotted the curve for CLD-PI (CLD-APEC). The activation energies of 28-14 (50%) (1.09 eV) and 28-23b (1.14 eV) systems are in a similar range. Additionally, switching from 28-14 (50%) (Tg=140° C.) to 28-23a (Tg=175° C., FIG. 8A) or 28-23b (Tg=167° C., FIG. 8B), the transition zone where the material stability drastically degrades is pushed significantly toward higher temperature range (in this case about 20° C. higher). Similar behavior is seen with 29-23b (Tg=193° C. FIG. 8A and FIG. 8B).

Figure 9:
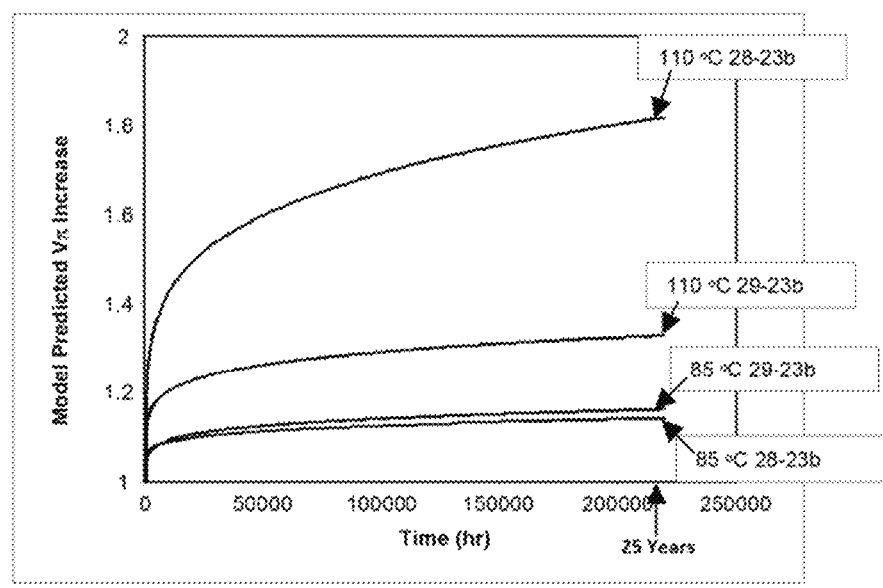
FIG. 9 illustrates Jonscher analyses of temporal stability according to certain embodiments.

The Jonscher equation was also used to compare 28-23b (55%) with 29-23b (55%) at 85° C. and 110° C. (FIG. 9). At 85° C., there was no significant difference in long term stability. At 110° C., 29-23b (55%) exhibited a 33% increase and 28-23b (55%) showed an 81% increase. This indicates that higher Tg polymer systems (e.g., 29) show advantages at higher operation temperature in long term performance.

Figure 10:
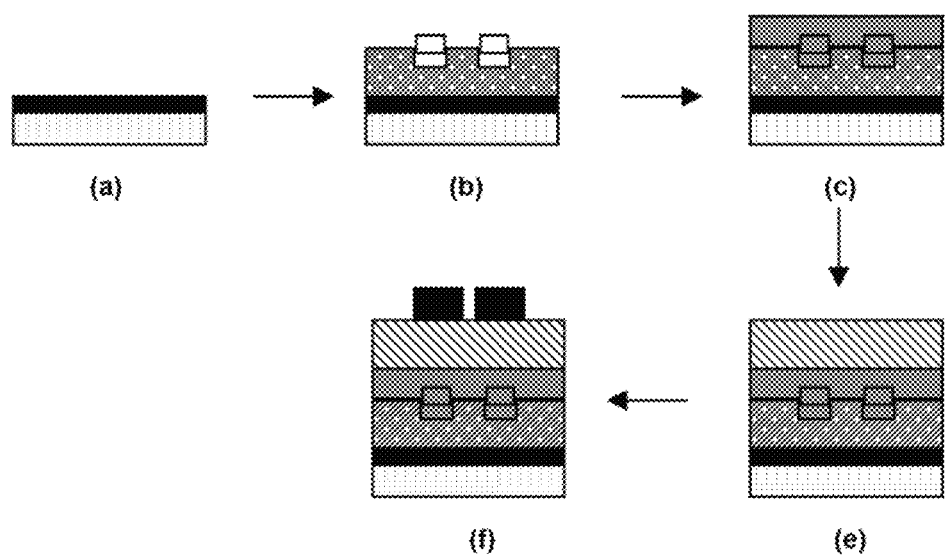
FIG. 10 illustrates fabrication steps for a polymer modulator.
Figure 11:
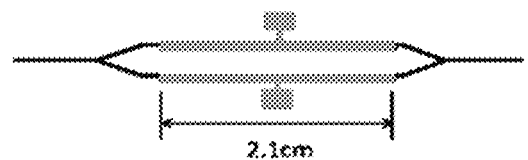
FIG. 11 illustrates a Mach-Zehnder interferometer and electrodes according to certain embodiments.
Figure 12:
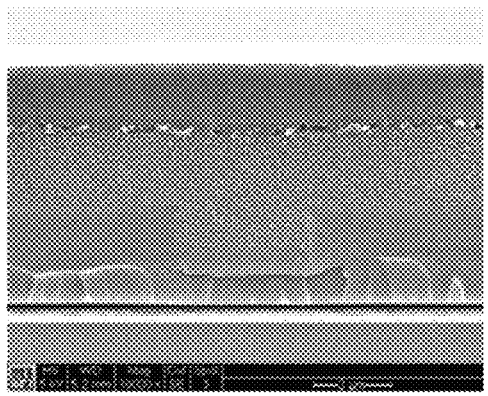
FIG. 12 illustrates a cross section of a polymer modulator stack.

Mach-Zehnder EO polymer modulators with 23a and 23b with inverted-rib waveguides were fabricated on 3 inch wafers. The device process flow is illustrated in FIG. 10. Bottom electrodes were sputtered and patterned, then the wafer was treated with an adhesion promoter having thiol and polar groups, then a layer of bottom clad (LP202C (a thermally curable, crosslinked sol-gel material), or UV15LV) was spun and cured. Inverted-rib waveguides were then fabricated on the bottom clad. After a plasma surface treatment of the bottom clad and the rib waveguides, the core layer of composites comprised of host polymer and chromophore 23a or 23b was deposited and thermally cured. The top clad LP33ND (a thermally curable, crosslinked sol-gel material) was spun and thermal cured after a surface treatment of the core layer. After the entire optical material stack of the device was built, the poling electrodes were deposited and patterned, followed by a poling process that was performed at a temperature range from 164° C. to 220° C. with a bias voltage range from 750V to 950V to align the chromophores. The choice of poling temperature and voltage depends on the core materials. The poling electrodes were also designed to serve as working electrodes with an active length of 2.1 cm. The devices were diced into individual chips for testing. The electrode configuration is shown in FIG. 11 and the cross sectional view of one of the polymer modulators is shown in FIG. 12.

Optical insertion loss, half-wave voltage ($V_{pi}$), and extinction ratio were measured. Device $V_{pi}$ and insertion loss are tabulated in Table 3. There is no significant difference between 23a and 23b with 28 as host polymer. Their insertion losses are also similar. When using 23b with 29 as host polymer, the $V_{pi}$ is higher.

TABLE 3

| $V_\pi$ and Insertion Loss of EO polymer modulators | | | |
|---|---|---|---|
| EO Polymer | Chip ID | V$\pi$ (V) | Insertion Loss (−dB/cm) |
| 28-23a (50%) | V25-25-A | 1.28 | 9.1 |
| 28-23a (55%) | V25-8-C | 1.09 | 10.8 |
| 28-23b (55%) | V25-43-C | 1.16 | 9.8 |
| 29-23b (55%) | V26-14-B | 1.42 | 8.3 |

Mach-Zehnder devices using 28-23b (55%) were studied at 85° C. for up to 1300-3000 hr (FIG. 13a). The normalized $V_{pi}$ of the 28-23b (55%) device was found to increase to about 1.02-1.04 times the baseline (initial) $V_{pi}$, which corresponds to a 2-4% decrease of $r_{33}$, which corresponds well to thin film $r_{33}$ tests. Using a Jonscher model to project 25-year performance (FIG. 13b), it is expected that devices made with 28-23b (55%) materials will exhibit an 11% $V_{pi}$ increase over 25 years.

Device stability was also studied for the higher Tg core 29-23b (55%). After 265 hr at 100 and 110° C., respectively, $V_{pi}$ was found to increase by 1.04 and 1.07 over the initial $V_{pi}$. We observed better stability of devices using a higher Tg core including the higher Tg host polymer 29. We further tested 29-23b (55%) up to 150° C. and 170° C. for 30 minutes, and found $V_{pi}$ increases from the initial $V_{pi}$ of 1.12 and 1.49 times, respectively. This indicates that short time exposures to high elevated temperatures does not ruin the device performance, thus making devices fabricated from this material more compatible with elevated temperature processing and/or more immune to failure resultant from short term over-temperature conditions.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. An electro-optic polymer comprising a host polymer and a poled guest nonlinear optical chromophore having the structure D-π-A, wherein: D is a donor; π is a π-bridge; A is an acceptor; at least one aryl substituent group is covalently attached to π; and the aryl substituent group has at least one non-covalent interaction with part of the host polymer that impedes chromophore depoling.

2. The electro-optic polymer of claim 1, wherein the non-covalent interaction is a pi-interaction, a size interaction, or a preorganized binding interaction.

3. The electro-optic polymer of claim 2, wherein the pi-interaction comprises at least one pi-system on the aryl group and at least one pi-system on the host polymer.

4. The electro-optic polymer of claim 3, wherein the pi-system on the aryl group comprises an aryl, polycyclic aryl, heterocyclic aryl, polyheterocyclic aryl group.

5. The electro-optic polymer of claim 4, wherein the pi-system on the host polymer comprises an aryl, polycyclic aryl, heterocyclic aryl, polyheterocyclic aryl group.

6. The electro-optic polymer of claim 5, wherein the pi-system on the aryl group is a pi-interacting donor or pi-interacting acceptor that is complementary to a pi-interacting donor or pi-interacting acceptor of the pi-system on the host polymer.

7. The electro-optic polymer of claim 1, wherein the electro-optic polymer has a glass transition temperature, and the bulky substituent impedes chromophore depoling below the glass transition temperature.

8. The electro-optic polymer of claim 1, wherein the chromophore comprises at least two aryl groups.

9. The electro-optic polymer of claim 8, wherein one aryl group is attached to π and one aryl group is attached to D or A.

10. The electro-optic polymer of claim 1, wherein: the chromophore has a melting point greater than 120° C.; the polymer has a glass transition temperature above 120° C.; and the electro-optic composite has a glass transition temperature above 120° C.

11. The electro-optic polymer of claim 10, wherein the loading density of the chromophore is greater than 20% by weight.

12. The electro-optic polymer of claim 10, wherein the loading density of the chromophore is greater than about 35% by weight.

13. The electro-optic polymer of claim 1, wherein D comprises

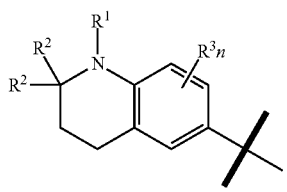

wherein R¹ independently comprises and alkyl, heteroalkyl, aryl, or heteroaryl group; R² independently at each occurrence comprises an H, alkyl group, heteroalkyl group, aryl group, or heteroaryl group; R³ independently at each occurrence comprises a halogen, an alkyl group, and heteroalkyl group, an aryl group, or a heteroaryl group; n is 0-3, and R¹ comprises the bulky group.

14. The electro-optic polymer of claim 13, wherein the electro-optic chromophore further comprises an aryl group attached to D or A.

15. An electro-optic composite comprising the nonlinear optical chromophore of claim 1, wherein the composite has greater than 80% temporal stability at 85° C. after 100 hours.

16. An electro-optic device comprising the electro-optic polymer of claim 1.

17. The electro-optic device of claim 16, wherein the electro-optic device includes a Mach-Zehnder interferometer, a Michelson interferometer, a micro-ring resonator, or a directional coupler.

18. An electro-optic polymer comprising a poled nonlinear optical chromophore and a host polymer, wherein the nonlinear optical chromophore is substituted with two or more aryl groups including one or more aryl groups substituted onto a π-bridge of the chromophore; and
   wherein the host polymer is configured to cooperate with the aryl groups to impede chromophore depoling.

19. The electro-optic polymer of claim 18, wherein the nonlinear optical chromophore has the structure D-π-A, and wherein: D is a donor; π is a π-bridge; A is an acceptor; D is substituted with an aryl group; and π is substituted with an aryl group.

20. The electro-optic polymer of claim 19, wherein the aryl groups and the polymer cooperate via pi-interactions.

21. An electro-optic polymer comprising:
   a poled nonlinear optical chromophore and a host polymer;
   wherein the nonlinear optical chromophore has he structure D-π-A, wherein D is a donor, π is a π-bridge, and A is an acceptor;
   wherein D substituted with an aryl group;
   wherein π is substituted with an aryl group; and
   wherein the aryl groups and the polymer cooperate via pi-interactions to impede chromophore depoling.

22. The electro-optic polymer of claim 21, wherein the aryl groups independently are an aryl hydrocarbon, an aryl polycyclic hydrocarbon, a heteroaryl, or a polycyclic heteroaryl.

23. The electro-optic polymer of claim 21, wherein the host polymer is a polycarbonate, a poly(arylene ether), a polysulfone, a polyimide, a polyester, a polyacrylate, or any copolymer thereof.

24. The electro-optic polymer of claim 21, wherein the host polymer has a Tg greater than 150° C. and is a polysulfone; a polyester; a polycarbonate; a polyimide; a polyimideester; a polyarylether; a poly(methacrylic acid ester); a poly(ether ketone); a polybenzothiazole; a polybenzoxazole; a polybenzobisthiazole; a polybenzobisoxazole; a poly(aryl oxide); a polyetherimide; a polyfluorene; a polyarylenevinylene; a polyquinoline, a polyvinylcarbazole; or any copolymer thereof.

25. An electro-optic device comprised of the electro-optic polymer of claim 18, wherein the electro-optic device has a $V_{pi}$ that does not increase more than 5% after 2000 hours at 85° C.

26. An electro-optic device comprised of the electro-optic polymer of claim 18, wherein the electro-optic device has a $V_{pi}$ that does not increase more than 10% after 2000 hours at 85° C.

27. An electro-optic device comprised of the electro-optic polymer of claim 18, wherein the electro-optic device has a $V_{pi}$ that does not increase more than 15% after 2000 hours at 85° C.

28. An electro-optic device comprised of the electro-optic polymer of claim 18, wherein the electro-optic device has a $V_{pi}$ that does not increase more than 20% after 2000 hours at 85° C.

29. An electro-optic polymer comprising a poled nonlinear optical chromophore and a host polymer, wherein:
   the nonlinear optical chromophore has a bulky substituent comprising at least one aryl group substituted onto a pi-bridge of the chromophore; and
   the host polymer has an aryl group selected to interact with the aryl group of the substituent.

30. The electro-optic polymer of claim 29, wherein the substituent comprises 2 or 3 aryl groups.

31. The electro-optic polymer of claim 30, wherein the chromophore has the structure D-π-A and the triaryl group has the structure

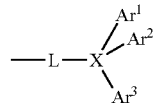

wherein: D is a donor; π is a p-bridge; A is an acceptor; X is a substituent center; Ar¹, Ar², and Ar³ are the aryl groups; and L is a covalent linker attached to D, π, or A.

32. An electro-optic polymer including a nonlinear optical chromophore having the structure D-π-A, wherein D is a donor, π is a π-bridge, A is an acceptor, and at least one of D or A is covalently attached to a bulky group comprising at least one aryl group, wherein π is covalently attached to a bulky group comprising at least one aryl group, and wherein the electro-optic polymer has greater temporal stability than when an alkyl group is substituted for the aryl groups.

33. The electro-optic polymer of claim 32, wherein the bulky group comprises at least two aryl groups, and wherein the electro-optic polymer has greater temporal stability than when alkyl groups are substituted for the aryl groups.

34. The electro-optic polymer of claim 33, wherein the bulky group comprises at least three aryl groups, and wherein the electro-optic polymer has greater temporal stability than when alkyl groups are substituted for the aryl groups.

35. An electro-optic polymer comprising a nonlinear optical chromophore and a host polymer, wherein: the nonlinear optical chromophore has a substituent group comprising at least two aryl groups with at least one of the aryl groups being substituted onto a pi-bridge of the electro-optic polymer; the host polymer comprises a subunit comprising at least two aryl groups; and the aryl groups of the nonlinear optical chromophore align preferentially with the aryl groups of the subunit.

36. The electro-optic polymer of claim 35, wherein the host polymer is a polysulfone; a polyester; a polycarbonate; a polyimide; a polyimideester; a polyarylether; a poly(methacrylic acid ester); a poly(ether ketone); a polybenzothiazole; a polybenzoxazole; a polybenzobisthiazole; a polybenzobisoxazole; a poly(aryl oxide); a polyetherimide; a polyfluorene; a polyarylenevinylene; a polyquinoline, a polyvinylcarbazole; or any copolymer thereof.

* * * * *